July 14, 1953  E. M. S. McWHIRTER ET AL  2,645,764
INTELLIGENCE EXCHANGE SYSTEM
Filed June 14, 1950  15 Sheets-Sheet 2

INVENTORS
ERIC M. S. McWHIRTER
FREDERICK G. POPP
BY
ATTORNEY

July 14, 1953

E. M. S. McWHIRTER ET AL 2,645,764

INTELLIGENCE EXCHANGE SYSTEM

Filed June 14, 1950

(DISPLAYING WEEK AHEAD AND DAY OF WEEK FOR 70 DAYS AND GOOD FOR 140 DAYS.)

YEAR 1949

| WEEK # | SU | MON | TUE | WED | THURS | FRI | SAT |
|---|---|---|---|---|---|---|---|
| | | | DAY # | | | | |
| | 1 | 2 | 3 | 4 | 5 | 6 | 7 |
| 1 | FEB 13 | 14 | 15 | 16 | 17 | 18 | 19 |
| 2 | FEB 20 | 21 | 22 | 23 | 24 | 25 | 26 |
| 3 | FEB 27 | 28 | MAR 1 | 2 | 3 | 4 | 5 |
| 4 | MAR 6 | 7 | 8 | 9 | 10 | 11 | 12 |
| 5 | MAR 13 | 14 | 15 | 16 | 17 | 18 | 19 |
| 6 | MAR 20 | 21 | 22 | 23 | 24 | 25 | 26 |
| 7 | MAR 27 | 28 | 29 | 30 | 31 | APR 1 | 2 |
| 8 | APR 3 | 4 | 5 | 6 | 7 | 8 | 9 |
| 9 | APR 10 | 11 | 12 | 13 | 14 | 15 | 16 |
| 0 | APR 17 | 18 | 19 | 20 | 21 | 22 | 23 |

INSTRUCTIONS

TO CALL FOR AN AVAILABILITY RECORD FOR ANY DATE:

DIAL SECTION COVERING DESTINATION-THEN

DIAL WEEK NUMBER
     DAY NUMBER

----------

ADVANCE CALENDAR 4 AM SUNDAY MORNING SO THAT WEEK NO. I IS CURRENT WEEK.

-----

CHANGE CALENDAR SHEETS MONTHLY

| FEB 13 | 14 | 15 | 16 | 17 | 18 | 19 |
|---|---|---|---|---|---|---|
| FEB 20 | 21 | 22 | 23 | 24 | 25 | 26 |
| FEB 27 | 28 | MAR 1 | 2 | 3 | 4 | 5 |
| MAR 6 | 7 | 8 | 9 | 10 | 11 | 12 |
| MAR 13 | 14 | 15 | 16 | 17 | 18 | 19 |
| MAR 20 | 21 | 22 | 23 | 24 | 25 | 26 |
| MAR 27 | 28 | 29 | 30 | 31 | APR 1 | 2 |
| APR 3 | 4 | 5 | 6 | 7 | 8 | 9 |
| APR 10 | 11 | 12 | 13 | 14 | 15 | 16 |
| APR 17 | 18 | 19 | 20 | 21 | 22 | 23 |
| APR 24 | 25 | 26 | 27 | 28 | 29 | 30 |
| MAY 1 | 2 | 3 | 4 | 5 | 6 | 7 |
| MAY 8 | 9 | 10 | 11 | 12 | 13 | 14 |
| MAY 15 | 16 | 17 | 18 | 19 | 20 | 21 |
| MAY 22 | 23 | 24 | 25 | 26 | 27 | 28 |
| MAY 29 | 30 | 31 | JUNE 1 | 2 | 3 | 4 |
| JUNE 5 | 6 | 7 | 8 | 9 | 10 | 11 |
| JUNE 12 | 13 | 14 | 15 | 16 | 17 | 18 |
| JUNE 19 | 20 | 21 | 22 | 23 | 24 | 25 |
| JUNE 26 | 27 | 28 | 29 | 30 | JULY 1 | 2 |

Fig. 3.

INVENTORS
ERIC M. S. McWHIRTER
FREDERICK G. POPP

BY

*Pucy P. Lantry*
ATTORNEY

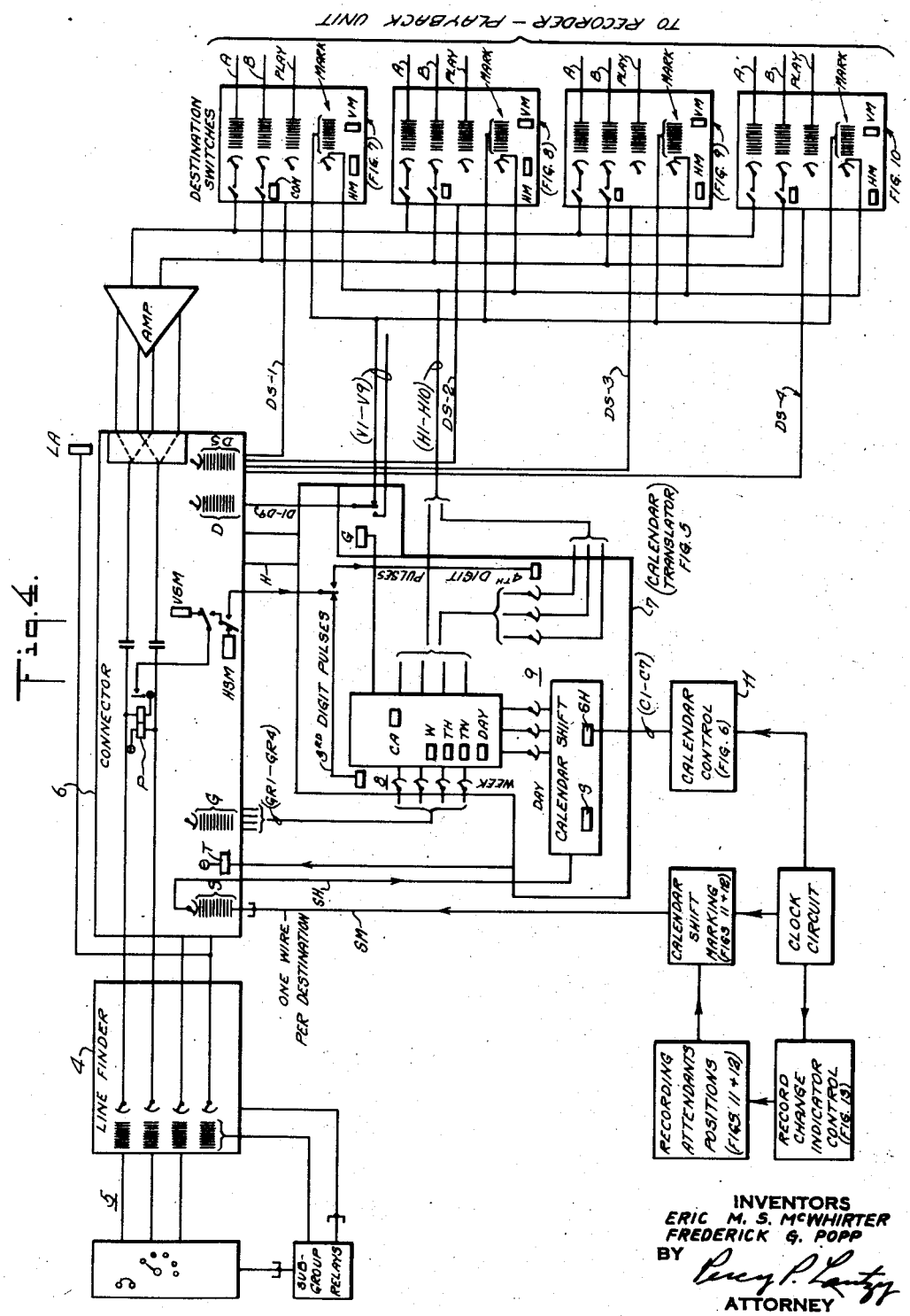

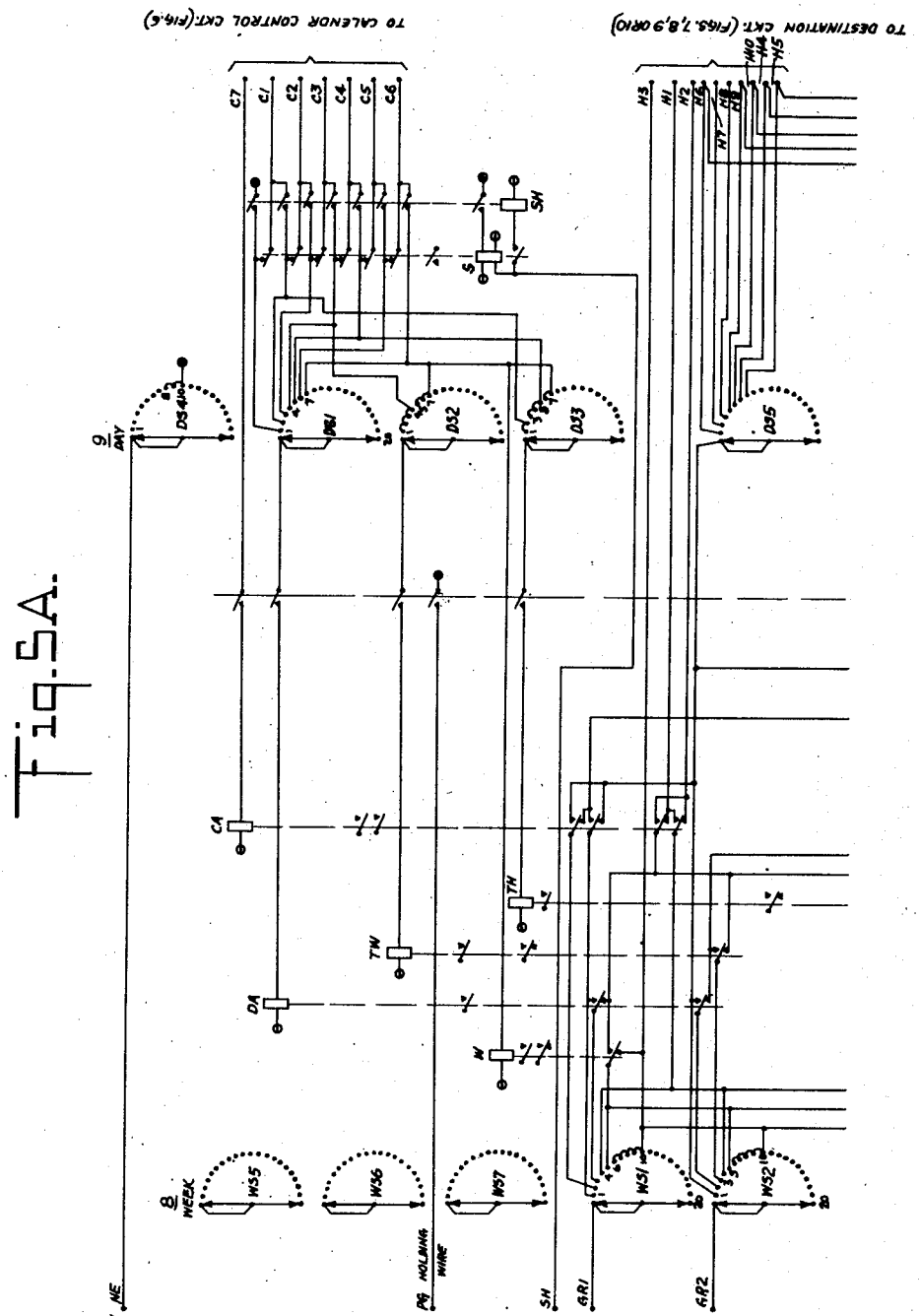

July 14, 1953  E. M. S. McWHIRTER ET AL  2,645,764
INTELLIGENCE EXCHANGE SYSTEM
Filed June 14, 1950  15 Sheets-Sheet 6

INVENTORS
ERIC M. S. McWHIRTER
FREDERICK G. POPP
BY
ATTORNEY

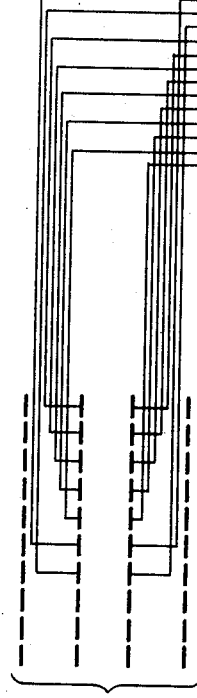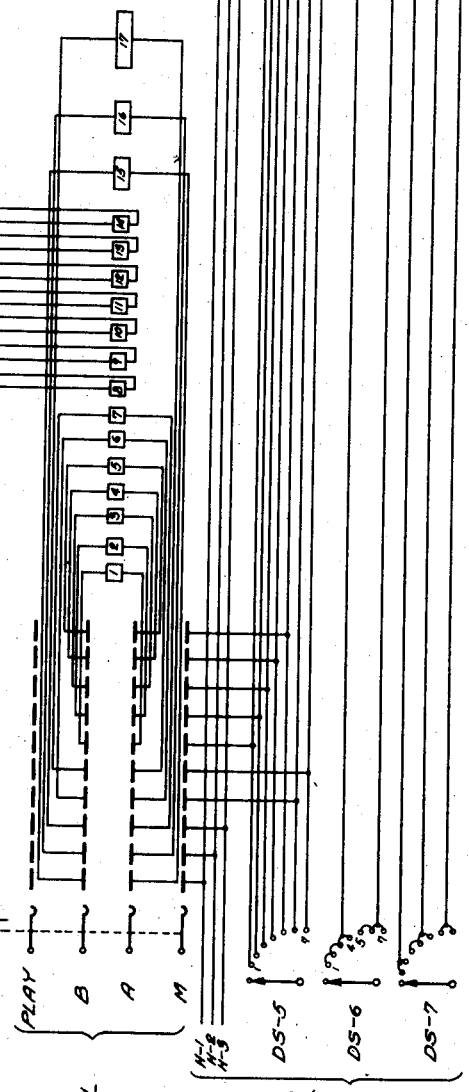

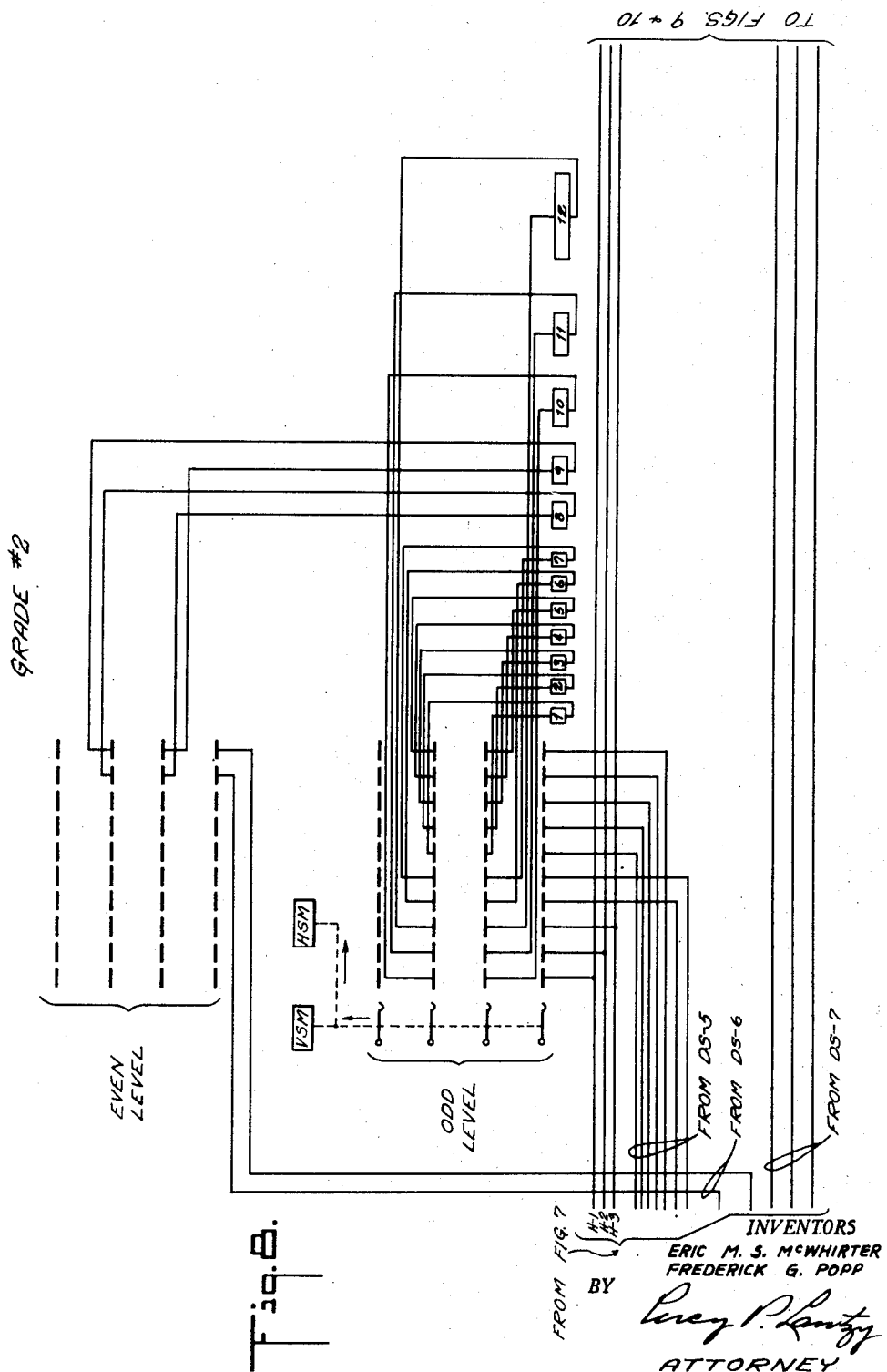

July 14, 1953 E. M. S. McWHIRTER ET AL 2,645,764
INTELLIGENCE EXCHANGE SYSTEM
Filed June 14, 1950 15 Sheets-Sheet 10
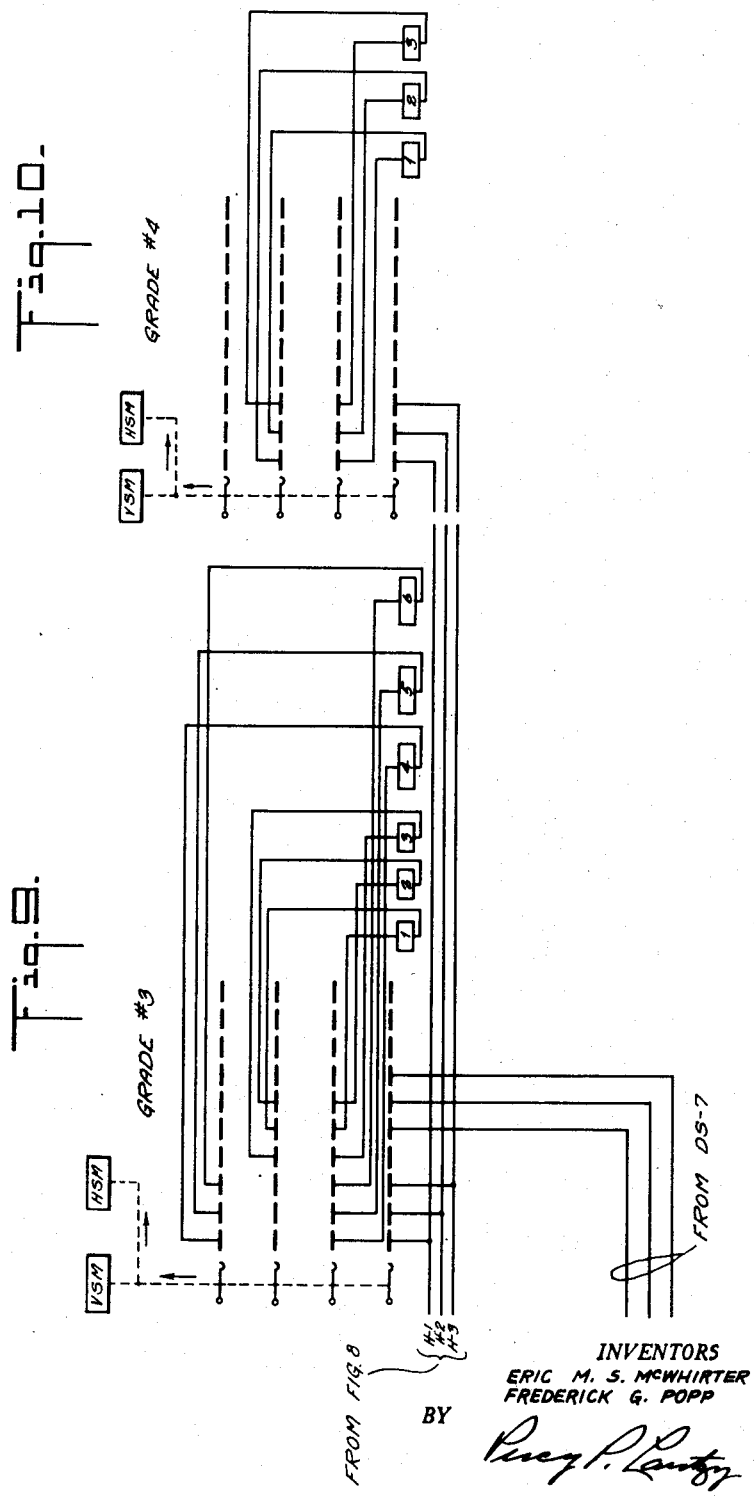
INVENTORS
ERIC M. S. McWHIRTER
FREDERICK G. POPP
BY
ATTORNEY July 14, 1953    E. M. S. McWHIRTER ET AL    2,645,764
INTELLIGENCE EXCHANGE SYSTEM Filed June 14, 1950    15 Sheets-Sheet 14

Fig.14.

INVENTORS
ERIC M. S. McWHIRTER
FREDERICK G. POPP
BY
*Percy P. Lantzy*
ATTORNEY

July 14, 1953

E. M. S. McWHIRTER ET AL 2,645,764

INTELLIGENCE EXCHANGE SYSTEM

Filed June 14, 1950

INVENTORS
ERIC M.S. McWHIRTER
FREDERICK G. POPP.
BY

ATTORNEY

Patented July 14, 1953

2,645,764

UNITED STATES PATENT OFFICE 2,645,764

INTELLIGENCE EXCHANGE SYSTEM

Eric Malcolm Swift McWhirter, Mount Vernon, and Frederick G. Popp, New York, N. Y., assignors to International Standard Electric Corporation, New York, N. Y., a corporation of Delaware Application June 14, 1950, Serial No. 177,534

44 Claims. (Cl. 340—153)

This invention relates to automatic telephone systems and more especially to intelligence exchange systems for automatically extending calling lines to called lines of different informational characteristics.

A principal object of the invention is to provide an automatic switching system whereby previously recorded information relating to any one of a number of future days can be automatically obtained by the dialing of a respective code number which represents the particular future week and day for which the said information is desired.

Another object is to provide an improved system for obtaining previously recorded information pertaining to any one of a number of future days, and employing a practical minimum number of recording and playback units.

Another object relates to a system for obtaining information pertaining to any desired future date or group of dates within a predetermined period, employing a series of recorder-playback units certain of which contain single-daily records and others of which contain multi-daily records, in conjunction with automatic switching arrangements for efficiently allocating said units so that the required total number thereof is only a relatively small percent of the total number of days within the said period.

Another object relates to a system which is particularly well suited to the obtaining at any time, of information as to accommodations, space availability or the like concerning devices requiring reservations such for example as railroad trains, aeroplanes, and the like, and wherein the reservation traffic varies either in accordance with the destination or the reservation date for a particular destination.

Another object is to provide a novel translating arrangement for translating information such as calendar data, destination data, etc., into a numerical digit code for controlling automatic switches to obtain previously recorded information pertaining to any destination and also to any desired day or group of days in a predetermined future period.

A feature of the invention relates to an automatic switching system controlled by coded dial pulses representing the week and day within a predetermined period for which is required certain information such as train space availability and the like, and employing a series of recorder playback units classified into single-daily units, fractional weekly units, weekly units, and multi-weekly units, whereby the total number of such units required to carry information for any part of said period can be greatly reduced.

Another feature relates to an automatic switching system employing a train of automatic switches at least one of which is selectively set in accordance with the traffic grade of a desired destination, and also in accordance with any desired portion of a predetermined future time period, to transmit to a calling station previously allotted information pertaining to said desired portion, and to said destination.

Another feature relates to an automatic switching system employing a train of automatic switches at least one of which can be selectively set in accordance with the traffic grade of a desired destination and also in accordance with the desired week or day in a predetermined future time period, and as to which desired day or week certain previously recorded information such for example as space availability, traffic information, etc. is required.

Another feature relates to a system having at a certain point a series of recorder-playback units some of which contain records pertaining to a whole week and others contain records pertaining to a part of a week; in conjunction with automatic switches controlled by a dialed code transmitted from any one of a large number of calling stations to select one of said units which contains the desired information for the conditions represented by said dialed code, the type of unit which is selected being automatically controlled by the time interval between the dialing date and the future date for which the information is desired.

Another feature relates to a novel calendar-translator circuit for translating a dialed numerical code, representing the date of a desired future day for which previously recorded information is obtainable, into distinctive electrically marked circuit conditions for automatically controlling an automatic switch to seize the desired one of a series of single-daily or multi-daily recorder-playback units, and so as to give preference to a single-daily unit whenever the information contained therein is current for the said desired day.

A further feature relates to an automatic telephone system employing a plurality of recorder-playback units certain of which contain single-day information records and others contain multi-day information records, in conjunction with a numerically-controlled connector switch, a series of grade-of-destination switches allotted to said connector switch; and in conjunction with a novel translator circuit which is jointly controlled by dialed numerical pulses and also by the time interval between the dialing date and the future date for which the recorded information is to be played back.

A further feature relates to the novel circuit arrangements and automatic switches for insuring that a calling station has played back to it the correct previously recorded information pertaining to a particular future date, even though the said information is at regular intervals undergoing a process of revision.

A further feature relates to novel recording attendants' equipment for keeping a continuously current record of data pertaining to future dates, on a series of recorder-playback units some of which are used for daily recordings, others for partial-weekly recordings, others for full-weekly recordings, and still others for multi-weekly recordings.

A still further feature relates to the novel organization, arrangement, and relative location and interconnection of parts which cooperate to provide an improved space or accommodation availability set-up for railroad systems, airline systems, or any other vehicular system.

Other features and advantages not particularly enumerated, will become apparent after a consideration of the following detailed descriptions and the appended claims.

In the drawings,

Fig. 3 is a view of a typical adjustable calendar used in determining certain of the code digits according to the invention.

Fig. 4 is a complete schematic diagram of a system according to the invention.

Figure 5B:
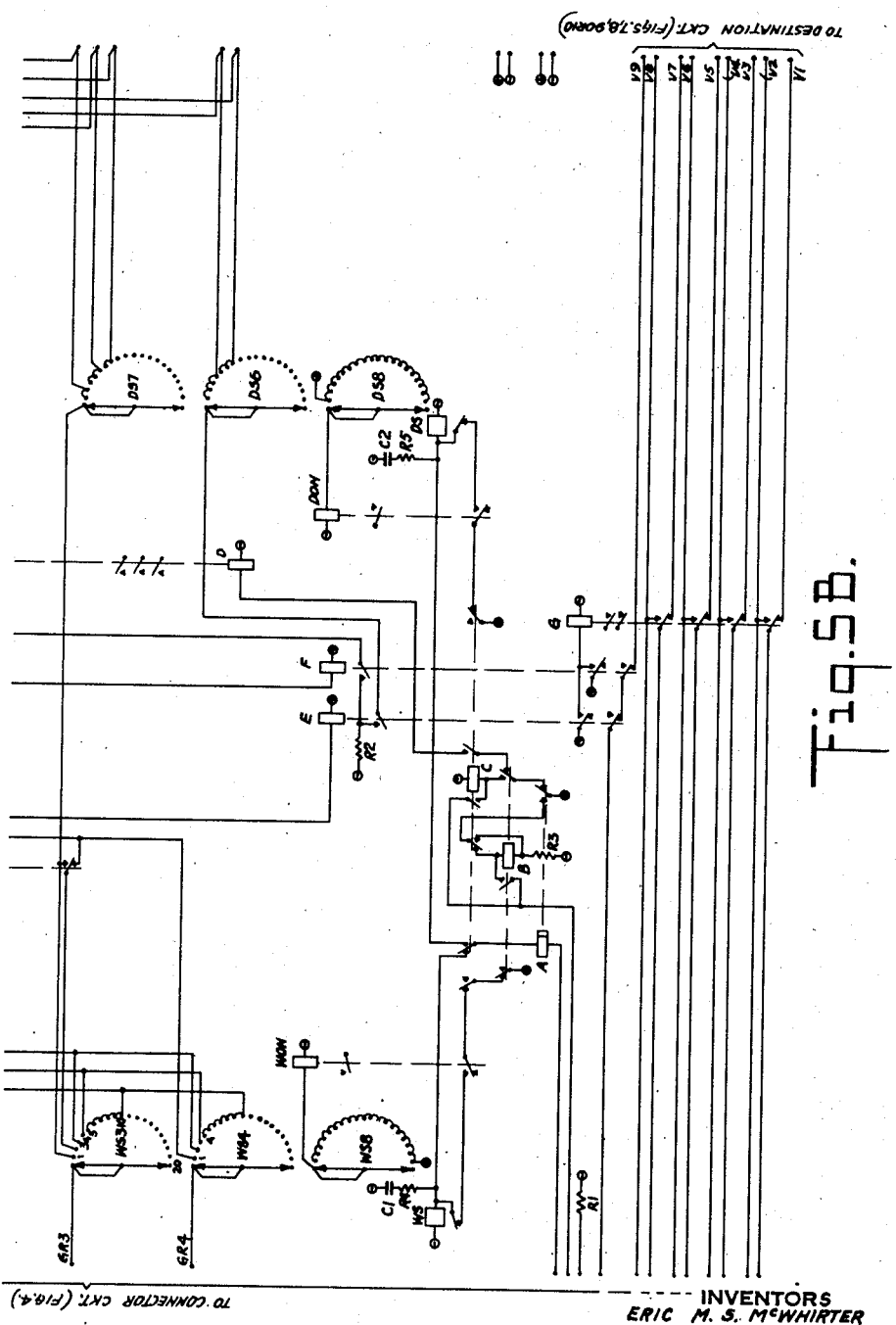

Figs. 5A and 5B together constitute a complete wiring diagram of the calendar-translator circuit according to the invention.

Figure 6:
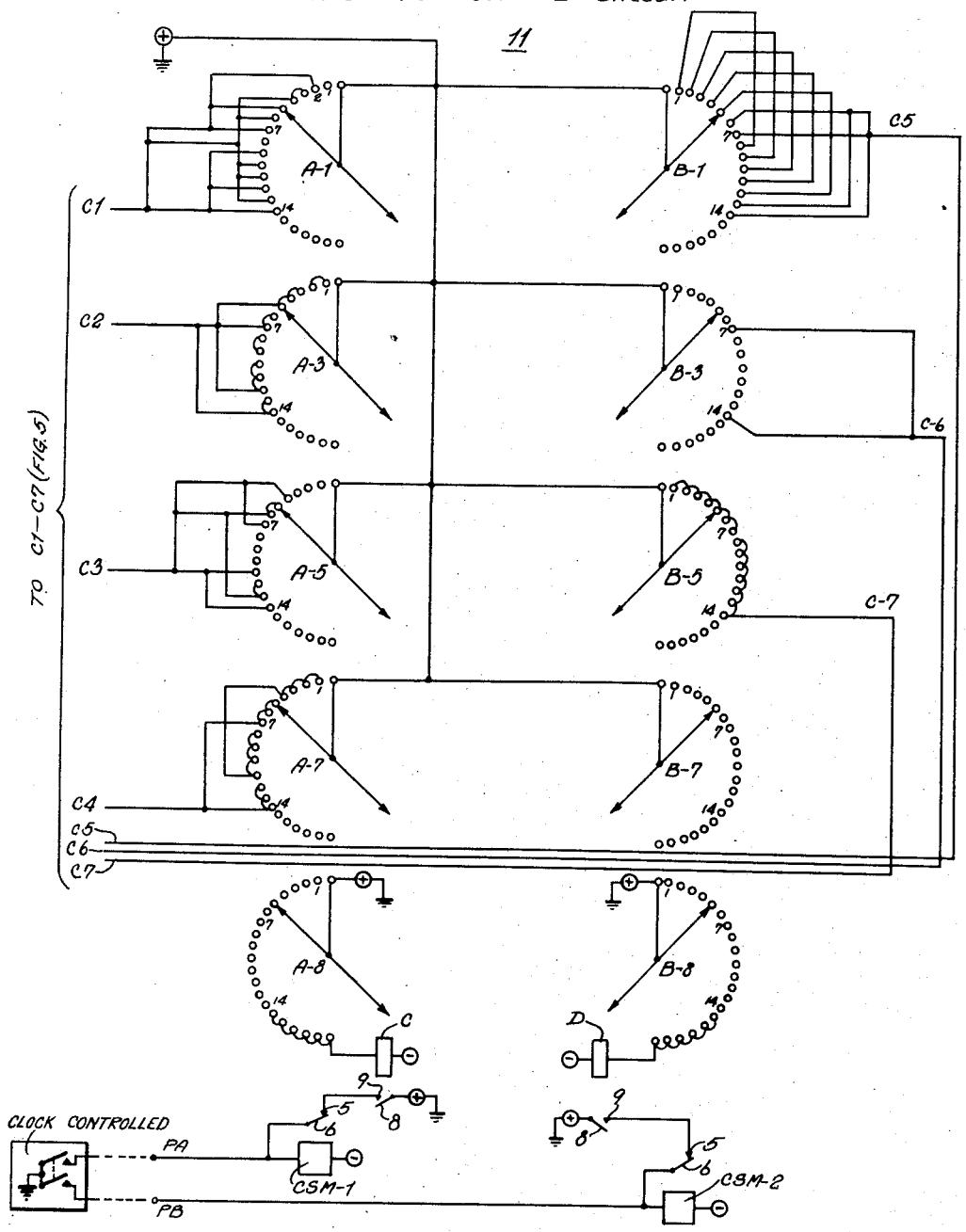

Fig. 6 is a detailed wiring diagram of the calendar control circuit.

Fig. 7 is a schematic wiring diagram of two of the levels of a grade #1 destination switch.

Fig. 8 is a schematic wiring diagram of two of the levels of a grade #2 destination switch.

Fig. 9 is a schematic wiring diagram of one of the levels of a grade #3 destination switch.

Fig. 10 is a schematic wiring diagram of one of the levels of a grade #4 destination switch.

Figure 11:
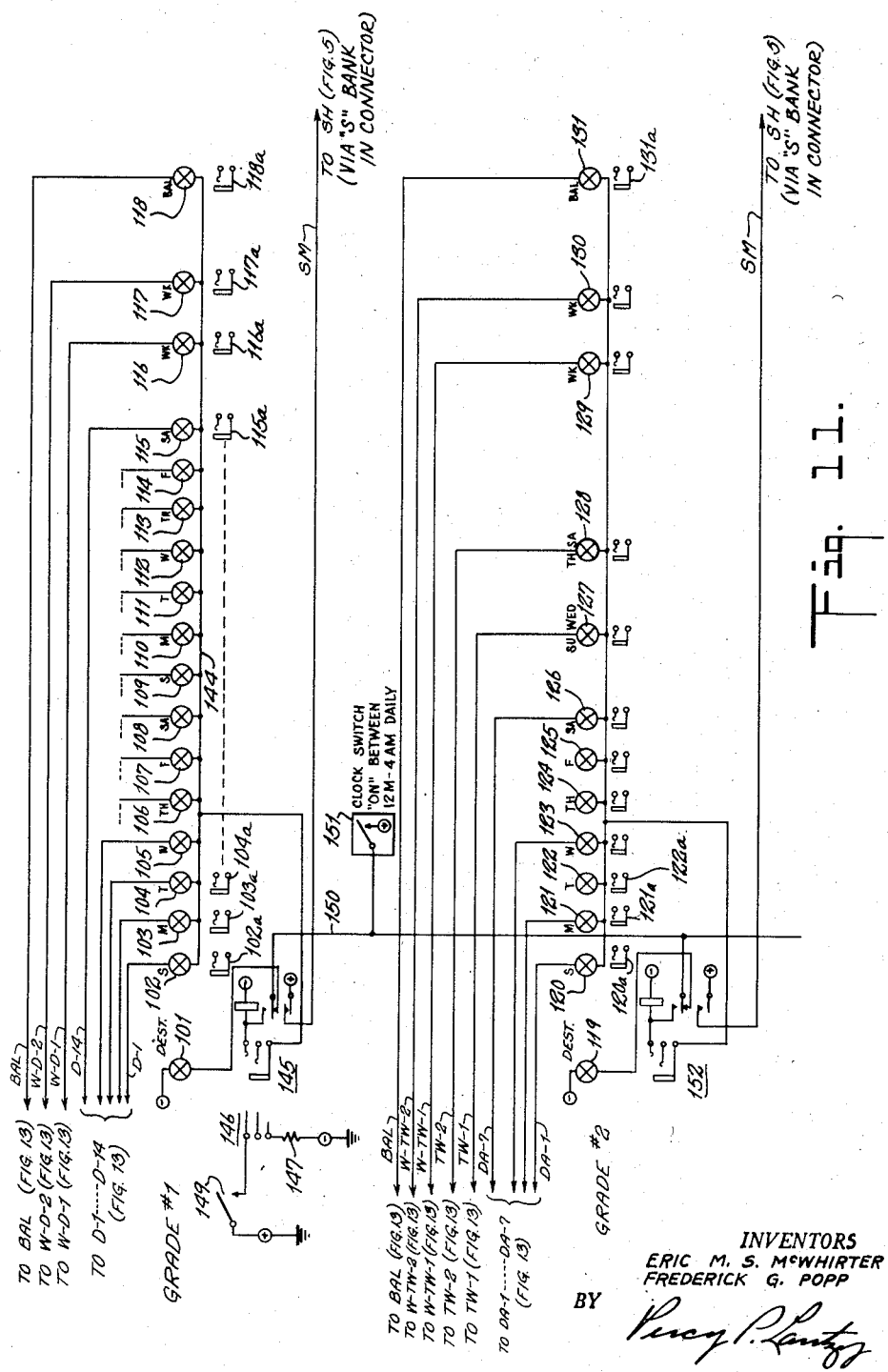

Fig. 11 shows two of the panels of the recording operator's position corresponding to a typical grade #1 destination and to a typical grade #2 destination. This figure also shows the corresponding portion of the calendar shift marking circuits.

Figure 12:
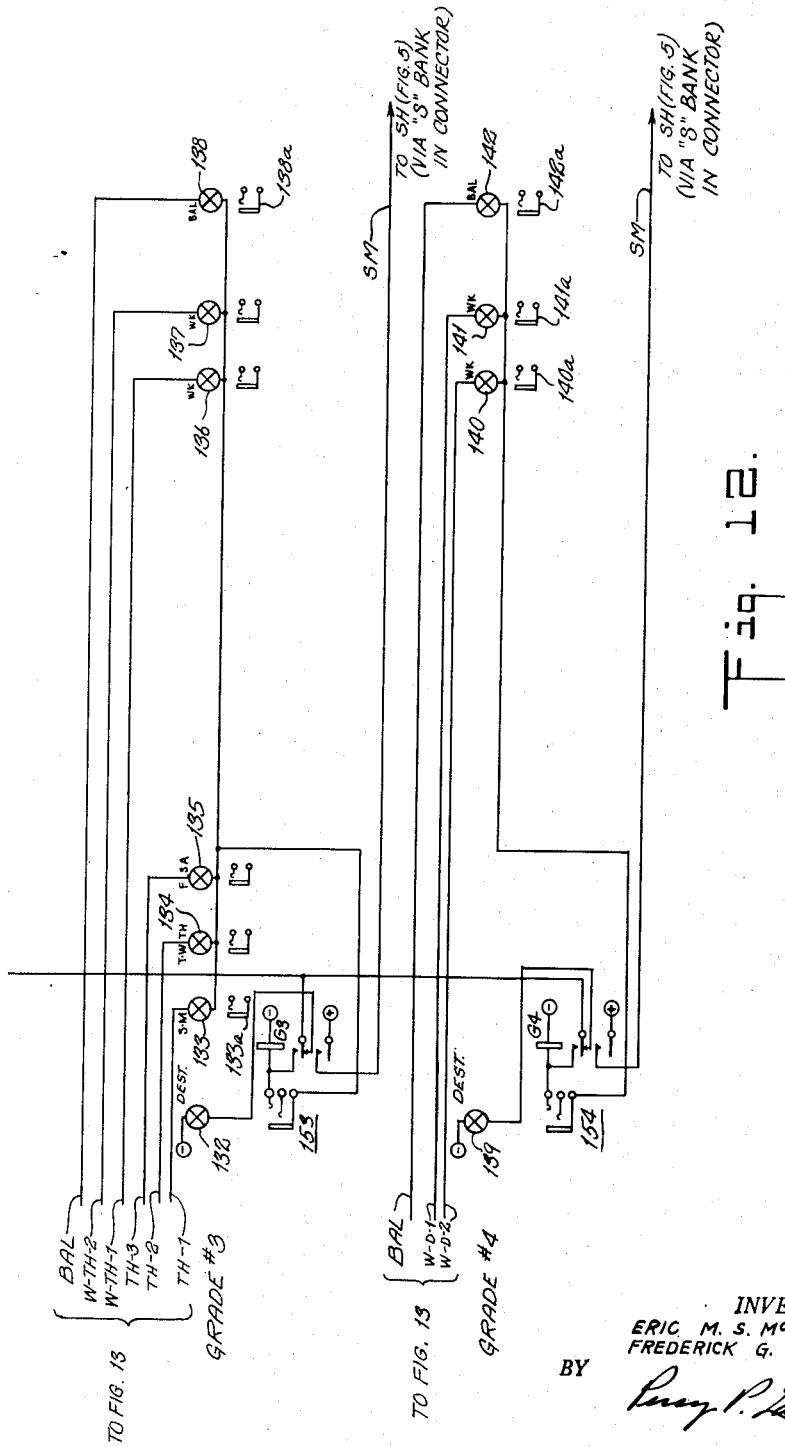

Fig. 12 shows two of the panels of the recording operator's position corresponding to a typical grade #3 destination and to a typical grade #4 destination. This figure also shows the corresponding portion of the calendar shift marking circuits.

Figure 13:
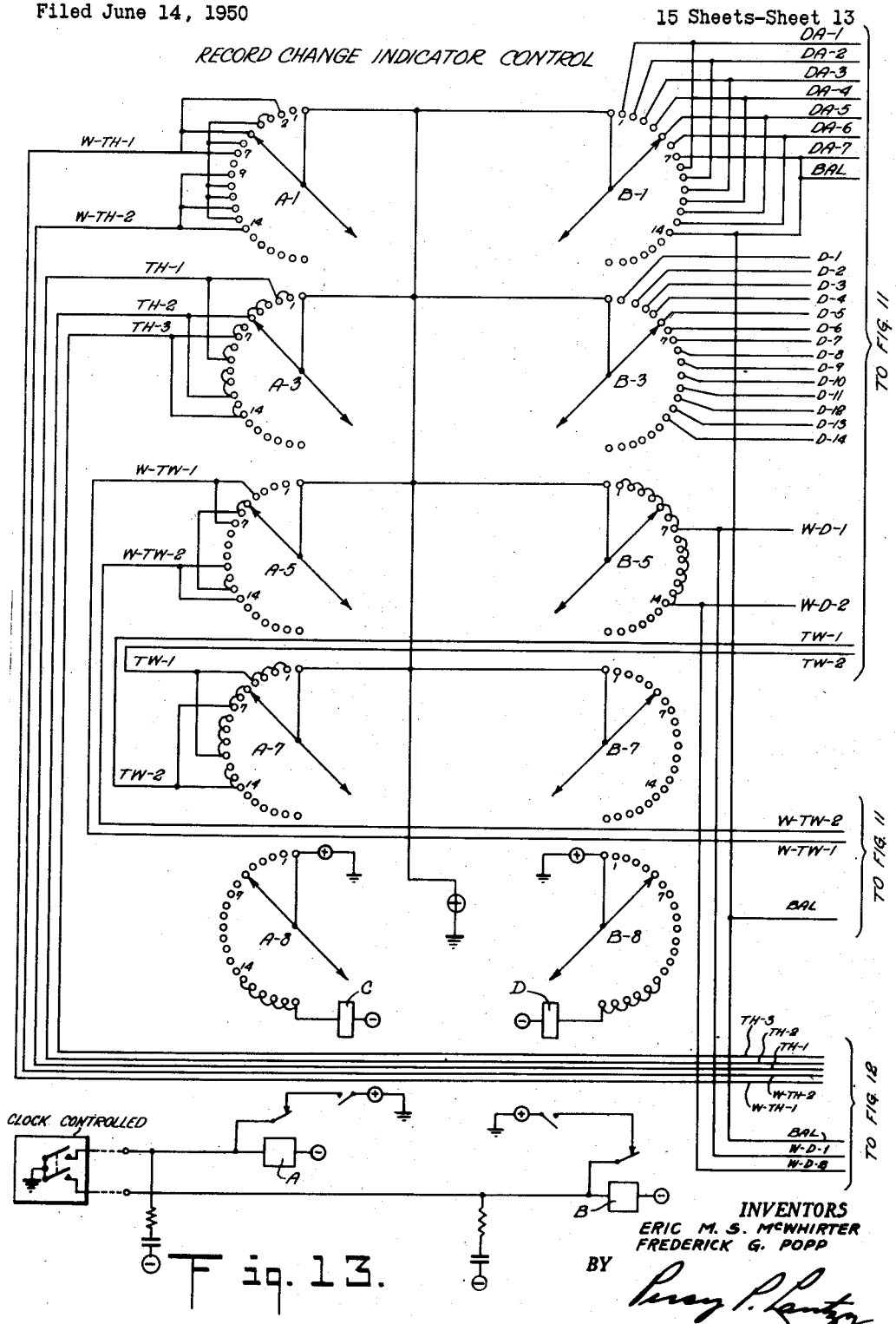

Fig. 13 is a detailed wiring diagram of the record-change indicator control.

Fig. 14 is an explanatory chart showing the manner in which the various types of recorders for a typical grade #1 destination are seized for various reservation dates and for corresponding dialing dates of a typical ten-week period.

Figs. 15, 16 and 17 are respectively diagrams similar to those of Fig. 14, but relating respectively to typical grade #2, grade #3 and grade #4 destinations.

Fig. 18 is a simplified schematic diagram of a typical motor control circuit for one of the recorder-playback units.

The invention finds its greatest and immediate utility in disseminating from a central point, information as to train schedules, for example information concerning the availability of space accommodations and the like, on trains or other vehicles which have scheduled runs between a central point and various destinations. For example, in making reservations for space accommodations on trains or other vehicles, it has been the practice heretofore to employ one or more announcing attendants at a central point who can be reached by ordinary telephone connection from any one of a large number of ticket selling or space reservation offices. During very heavy traffic seasons, considerable delay and inconvenience are encountered before the announcing attendant at the central point can be reached by any particular reservation clerk. In fact, the obtaining of the desired information as to available space in, to a great degree, a function of the personal element and of the assiduity of the reservation clerk in making repeated calls to the announcing attendant until a conversational connection is finally established. Furthermore, even after the connection has been established, much time is consumed in conveying the requested reservation data to the announcing attendant, and also by the announcing attendant having to consult a great number of records to determine what space or accommodations are available on any desired date, which may vary from one day to as many as ten weeks or more from the date on which the reservation information call is being placed.

In accordance with the present invention, the above-noted and other difficulties and inconveniences are avoided by employing a series of recorder-playback units which carry records of space availability and the like for every day during a future seventy-day period, counting from the day on which the reservation information is being requested. It would not be economically feasible to employ a separate recorder-playback unit for each of the seventy days, since that would require seventy such recorder-playback units for each destination. Furthermore, since traffic conditions to certain destinations may be consistently heavier than to other destinations, the recorder-playback units allotted to the destinations of lower traffic demand would be inefficiently used. Furthermore, distinction must be allowed between relatively short hauls and relatively long hauls. Merely for purposes of explaining the invention, the various destinations, considered from any central point, for example from New York city, may be divided into four traffic grades. For example a grade #1 destination may be one where the daily reservations are in great and relatively uniform demand for two weeks ahead, the demand dropping off as the future reservation date exceeds two weeks. A grade #2 destination might then, for example, be one where the demand is relatively great and uniform for one week in advance, whereas for the remaining weeks in advance the demand falls off. In other words, the grading will be determined in accordance with the expected heaviness of reservation traffic, considered from any dialing date. The particular week in which the said calling date appears, is referred to herein as the current week.

For purposes of clarity in description, the day upon which the reservation clerk is dialing to receive the future reservation data, will be referred to herein as the "dialing date," Sunday of the current week will be referred to as the "current Sunday"; and the date for which the desired information is being sought will be referred to as the "reservation date."

Figure 2:
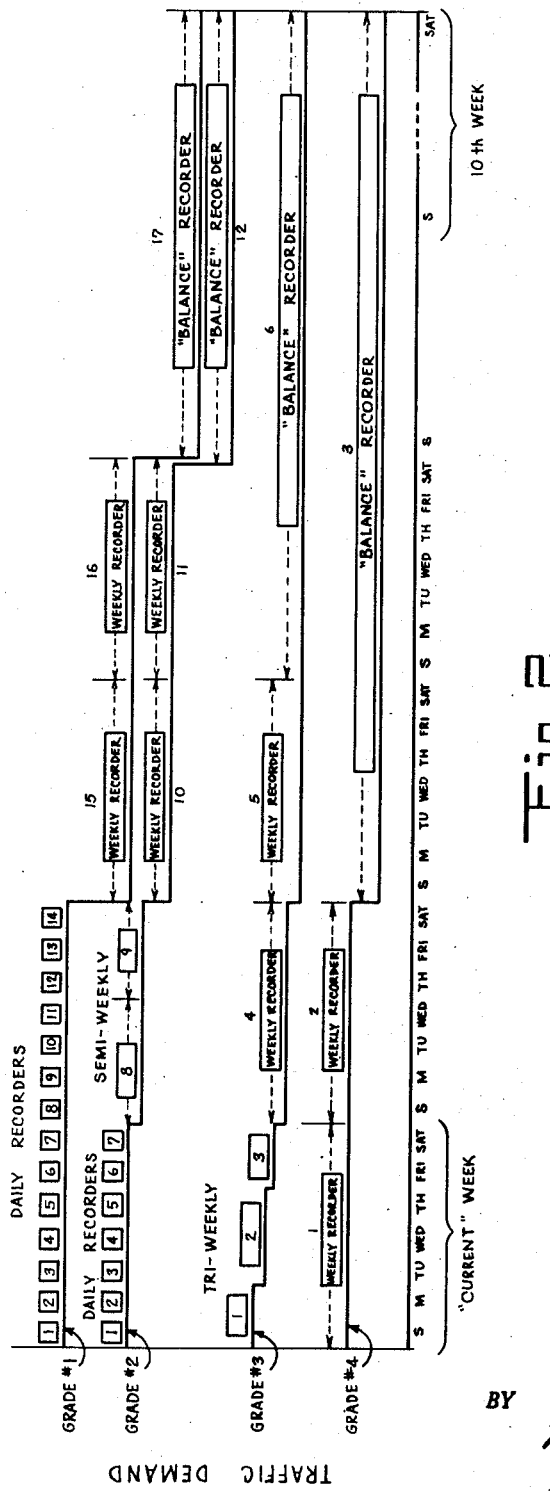
Fig. 2 is a composite graph and schematic block diagram explaining the allotment of the various recorder-playback units for four different types of destinations.

The four graphs of Fig. 2 illustrate typical expected traffic conditions over a ten-week period, for example between New York city and four different destinations. In Fig. 2 it will be seen that the graph representing a grade #1 destination, requires an individual daily recorder-playback units Nos. 1-14 for two full weeks in advance, these recorder-playback units being represented by the small squares adjacent the graph. Therefore, during the current week and the second week, an individual recorder-playback unit is provided for each day, each recorder-playback unit containing only a complete daily record of the train and space availability with respect to the destination which information has been previously recorded thereon by a recording operator. The advance reservations for the third week as a whole can be contained on a single weekly recorder-playback unit #15. In other words, for the third week in advance, the single weekly recorder-playback unit contains all information as to trains, space availability, etc., for the entire third week. Likewise for the fourth week in advance, a single weekly recorder-playback unit #16 is also provided. For the fifth to the tenth weeks, a single "balance" recorder unit #17 may be used, containing all the information as to trains, space availability, etc., for the five remaining weeks of the ten-week period. Thus for a grade #1 destination for a ten-week period, a total of seventeen recorder-playback units only are required, these recorders being used in the same way for each subsequent ten-week period.

In the case of a grade #2 destination, seven daily recorder-playback units Nos. 1-7 are provided for the individual days of the current week, and two recorder-playback units Nos. 8 and 9 are provided for the entire second week. The first of these two units may contain the information for Sunday, Monday, Tuesday and Wednesday of the second week, and the other unit may contain the information for the Thursday, Friday and Saturday of the second week. The third and fourth weeks may each be allotted an individual weekly recorder-playback unit Nos. 10 and 11, and a single "balance" recorder-playback unit No. 12 may be allotted for the remaining five to ten weeks. Thus for a grade #2 destination, a total of only twelve recorder-playback units may be required for a full ten-week period.

In the case of a grade #3 destination, a single recorder-playback unit No. 1 may be allotted for the Sunday and Monday of the current week; a second recorder-playback unit No. 2 may be allotted for the Tuesday, Wednesday and Thursday of the current week; and a third recorder-playback unit No. 3 may be allotted for the Friday and Saturday of the current week. A single recorder-playback unit No. 4 may be allotted for the entire second week; an additional single recorder-playback unit No. 5 may be allotted for the third week; and a single additional "balance" recorder-playback unit No. 6 may be allotted for the remaining seven-week period. Thus a total of six recorder-playback units may be required for this grade of destination, for a full ten-week period.

In the case of a grade #4 destination, a single recorder-playback unit No. 1 may be allotted for the entire current week; a single recorder-playback unit No. 2 may be allotted for the entire second week; and a single recorder-playback unit No. 3 may be allotted for the entire balance of eight weeks. Thus a total of three recorder-playback units may be used for this grade of destination, for a full ten-week period. In any event, it will be clear that the greatest reservation traffic will occur during early weeks of the ten-week period, thus requiring a greater number of recorder-playback units for those early weeks. It will be understood also that the invention is not limited to any particular kind of recorder-playback unit. Preferably, however, each of these units is of the well-known magnetic type or magnetic wire type, whether of the type using an endless band or sheet mounted on a rotary drum, a disc, or any other well-known unit where the pick-up device can be used to rescan or repeatedly trace the record previously recorded on the record blank. In fact any kind of sound record playback device may be used, whether magnetic, mechanical, photographic, etc.

In addition to providing a very substantial reduction in the number of total recorder-playback units, is the advantage that the invention reduces the time required for the reservation clerk to listen for the required information. For example, in the most extreme case, if only one recorder-playback unit were used for the entire ten-week period for each destination, the record thereon would have to be impracticably long, since it would have to contain all the train and space availability information for the entire ten weeks, and the reservation clerk would have to listen continuously as the record is played back until the particular date in which he is interested appears in the record. It is desirable, therefore, to be able to utilize, if possible, for any given furture date, a daily recorder-playback unit, or a unit having the shortest but complete record for the period which includes the reservation date. One of the advantages of the present invention is, therefore, the automatic switching from a weekly or semi-weekly or "balance" recorder-playback unit to a daily unit where the reservation date is within a predetermined number of days, for example seven or fourteen, from the actual day on which the reservation data is being requested. When the information on one of these individual daily units becomes obsolete, as each day passes (so far as its previous recorded information is concerned), when it is automatically selected it will, in the case of a grade #1 destination, contain a daily record for the corresponding day, two weeks in advance, or for the corresponding day one week in advance in the case of a grade #2 destination. This automatic selection, in accordince with the present invention, is determined in part by the intervening number of days between the dialing date and the reservation date. For example, in the case of a grade #1 destination, fourteen daily recorder-playback units are allotted. If the reservation date is any day during this two-week period, a unit having only a daily record will be automatically connected in circuit. If, for example, the date is during the third week, for example Sunday of the third week, and if the dialing date is Tuesday of the current week, the arrangement is such that instead of automatically connecting a weekly unit, a daily unit having the daily record for the desired date is automatically connected in circuit, the recording attendant having in the meanwhile replaced the obsolete information by the information for the day two weeks in advance thereof. In the case of grade #2 destinations, as each day passes the attendant revises the information so that it refers to a date one week in advance. In other words, on a grade #1 destination for any reservation date during the current week and for any reservation date during a period of fourteen days after the dialing date, the system automatically selects a daily recorder for the desired date. On a grade #2 destination for any reservation date during the current week and for any reservation date during a period of seven days after the dialing date, the system automatically selects a single daily record. On a grade #3 destination, the system automatically selects for a reservation on Sunday and Monday of the current week, a two-day record; on Tuesday, Wednesday and Thursday, a three-day record; and on Friday and Saturday, a two-day record. For a grade #4 destination for any reservation date during the current week, there is obtained only a single weekly record for the entire week. It will be understood, of course, that as each day passes, the information contained on the daily recorder-playback unit allotted thereto has become obsolete, and at a fixed period each night, for example between 12 m. and 4 a. m. the recording attendant will replace the information on that particular unit so that in the case of a grade #1 destination the new information is a daily record for the date two weeks in advance of the current day of the current week. Likewise on a grade #2 destination, as each day passes during the current week, the daily information previously recorded on the unit allotted thereto has become obsolete and in the period 12 m. to 4 a. m. of the following morning, the recording attendant will replace the information on that particular unit with the information corresponding to a date one week in advance. In the case of a grade #3 destination, each night the attendant changes the record on the appropriate units to delete therefrom the obsolete information for the preceding day which has now passed. Likewise, on grade #4 destinations, the attendant every night deletes from the appropriate units the obsolete information for the day that has just passed.

In accordance with the present invention, any reservation clerk, by merely dialing a four-digit code number, can control conventional automatic telephone switches to connect in circuit with his telephone subset the particular recorder-playback unit which contains the up-to-date information record for any particular reservation date desired. The system is arranged so that in the case of grade #1 when the reservation date is less than fourteen days in advance of the day on which the data is being requested, a recorder-playback unit having a daily record only, will be selected, as distinguished from a tri-weekly record, a semi-weekly record, a weekly record, or a "balance" record. In other words, the system will not only select the proper recorder-playback unit containing the proper information for the desired destination for the desired reservation date, but it will, during the heavy reservation traffic period, select the type of recorder-playback unit which consumes the least amount of time in playing back the information to the reservation clerk.

Generalized description

Figure 1:
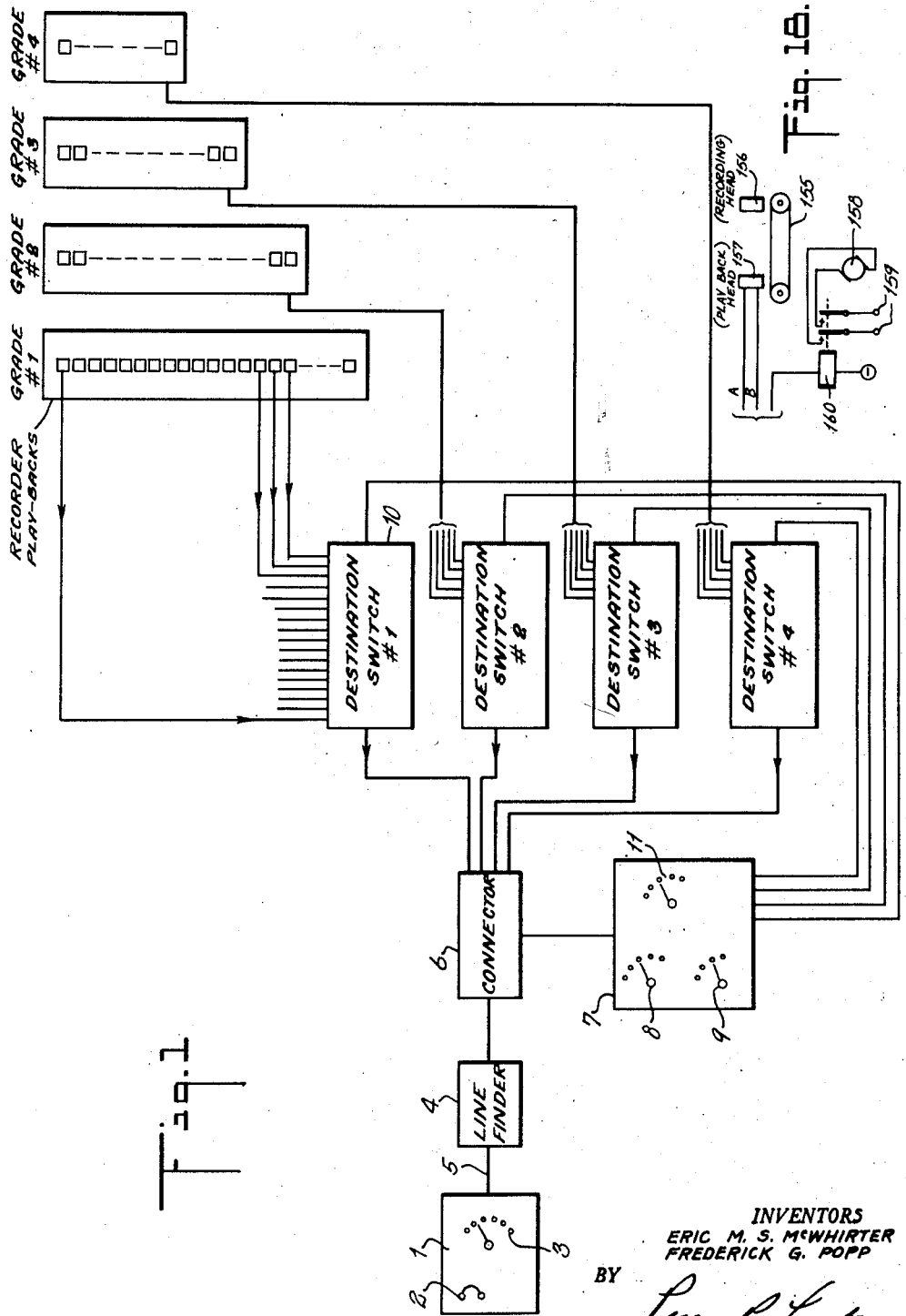
Fig. 1 is a simplified schematic block diagram of a system embodying the invention.

Referring to Fig. 1, there is shown in the most simplified schematic form, a typical set-up corresponding to the automatic selection of a grade #1 destination. The numeral 1 represents any well-known telephone subscriber's subset comprising the transmitter-receiver 2 and the numerical dial 3. It will be understood that the subset 1 represents only one of a large number of such subsets to be used by reservation clerks. Upon initiating a call to obtain the information, an available line finder switch 4 automatically seeks the calling line 5. When this line is found, the usual dial tone is automatically transmitted to the reservation clerk, who thereupon dials the appropriate four-digit code number which represents the desired destination and the particular week and day for which the space availability or other train information is required. In accordance with conventional automatic telephone system practice, the brushes of line finder 4 are connected to the brushes of an automatic connector switch 6 which, for example, may be of the step-by-step or up-and-around type. As is well-known, such switches have banks of fixed contact sets, with the banks arranged in successive parallel levels and with the brush assembly capable of being raised in response to the first digit to the appropriate level, and then in response to the second digit the brushes are moved step by step around the desired level to select the appropriate contact set. Certain of the contacts in each set of bank contacts of switch 6 are multipled to a special calendar translator circuit 7 which comprises two separate step-by-step numerical switches 8, 9, which respond respectively to the third and fourth digit pulses representing respectively the week and day of the reservation date.

The bank contacts of switch 6 are strapped so that, depending upon where that switch is set, it will mark one of the destination switches allotted to destinations of the same grade. When the appropriate destination switch has been marked by connector 6, and when the switches 8 and 9 have been moved to a particular set of contacts in their respective contact banks, a corresponding particular set of bank contacts of switch 10 is "marked," whereupon the brushes of switch 10 are caused to hunt for the said "marked" contacts. Each set of bank contacts in switch 10 leads to a respective recorder-playback unit on which the space availability, train information, etc., for a corresponding date, has been previously recorded by a recording operator, as will be described hereinbelow. The translator circuit 7 also includes a clock-controlled step-by-step calendar switch 11 whose brushes rest upon the corresponding #1 bank contact sets during the Sunday of the odd-numbered weeks, counting the current week as week #1. At 4 a. m. on Monday, the brushes of the calendar switch are automatically moved to the #2 contact set; and likewise at 4 a. m. on each succeeding day, these brushes are moved to the next succeeding contact set. The main purpose of switch 11 and its associated circuits is to control the final setting of destination switch 10 in accordance with the number of days intervening between the dialing date and the reservation date, and to determine which one of two successive weeks contains the dialing date, so as to connect into the talking circuit of the established telephone connection to the subset 1, wherever possible, a recorder-playback unit having only a daily record. In the case of a grade #1 destination, where fourteen daily recorder-playback units are allotted for the current week and for the second week, if the intervening number of days from the dialing date to the reservation date is less than fourteen, a recorder-playback unit having only a daily record will always be automatically selected. In the absence of this calendar switch it might happen that a semi-weekly, a weekly, or even a "balance" recorder-playback unit may be connected in circuit, and the reservation clerk would then have to listen to an unnecessary length of record before reaching the information for the particular reservation date. In other words, the combined simultaneous settings of the week switch 8, of the day switch 9, and of the calendar switch 11, determine the particular set of bank contacts upon which the brushes of switch 10 stop.

Since the operation of line finder switches, connector switches and numerical switches controlled by dialed impulse, are well-known in the art, detailed description thereof is not necessary herein. However, for a disclosure of the typical operational circuits of such switches, reference may be had to "Automatic Telephony" a book published by McGraw-Hill Book Co., New York, N. Y., 1921.

Each set of selected bank contacts of a destination switch 10 controls the starting of the respective playback mechanism of the selected record unit, and also completes a talking connection from that unit through the switches 10, 6 and 4 to the reservation clerk station 1. In order that the various records may be revised from day to day, the four-hour period between 12 m. and 4 a. m. is used for that purpose. The circuits are so arranged that if the reservation clerk dials for information during that period of any day, and if the records have been revised, he will, wherever the number of intervening days between dialing and reservation dates warrants it, automatically select a recorder containing the revised appropriately-shortened information, but if the records have not been revised and the dialing is done during the revision period, he will, under the same conditions, automatically select a recorder containing the correct information but for a longer period, for example he might have to listen to a semi-weekly, tri-weekly, or even a weekly record in place of a daily record. This part of the system is under control of the calendar shift marking circuit. As soon as any given recorder becomes available for a subsequent date, the recording attendant by means of a special key, controls the said calendar shift marking circuit so that when the appropriate recorder is automatically selected, it will contain the desired information in the shortest form, dependent upon the grade of destination and the relation between the reservation date and the dialing date. In other words, regardless when the dialing is effected, the reservation clerk will always receive correct information.

*General description of apparatus*

Referring to Fig. 4 the central office apparatus comprises the following:

(1) The automatic telephone switching equipment which responds to a four-digit code transmitted by the reservation clerk and corresponding to the destination and date of the trip for which information is desired, which equipment establishes a talking connection from the reservation clerk's station to the appropriate recorder-playback unit through a suitable amplifier.

(2) Magnetic recorders which may contain different records, depending upon whether they contain a full daily record only, a tri-weekly record only, a semi-weekly record only, a weekly record, or a multi-week record only. The last-mentioned kind is referred to herein as a "balance" recorder. When the talking connection has been automatically established between the selected recorder-playback unit and the reservation clerk's subset, the said unit starts to play back its record, and continuously repeats that record which has previously been recorded thereon by a recording attendant. These recordings are completely revised by the attendant whenever necessary, for example between 12 m. and 4 a. m. of each day, to make sure that each unit contains the proper information for the appropriate future date.

(3) The recording attendant's equipment may comprise, for example, a board having a series of panels of telephone jacks, each with an individual indicator lamp, and recording jack adjacent thereto. Each such panel will be allotted to a particular destination. The number of jacks and lamps in each row will be in accordance with the number and type of the various recorder-playback units allotted for that grade of destination, and each jack may be provided with a shiftable indicator showing the actual calendar date corresponding to each jack. Each recording jack has connected to it one of the said recorder-playback units, so that by plugging into any recording jack, the attendant can record on the associated unit any kind of information for that particular corresponding date. This information for example may comprise available space or accommodations for sale, train dates, or any other message such as train delays, news of accidents, etc.

*The switching equipment*

The various automatic switches may be of any well-known type, such for example as those used in step-by-step automatic telephone exchange systems, each comprising the usual stepping magnets, off-normal contacts, banks of stationary contacts, and associated rotary brushes. In general these switches are of the kinds:

(1) "Line Finder" which hunts for the line of the calling reservation clerk to complete a metallic talking and pulsing circuit to a connector switch.

(2) "Connector Switch" to mark for operation one of a series, destination switches. These connectors may be of the up-and-around type with the usual stepping magnets for controlling the vertical and horizontal stepping motions of the brushes and the usual change-over relay and off-normal contacts. The circuits for this switch are modified to cooperate with a calendar-translator circuit and with the marked destination switch. Every connector switch is used with a high and a low amplifier which can be selectively connected in the talking circuit. Each connector switch has four brushes which cooperate with four contacts in each set of bank contacts, the four brushes and corresponding terminals in each set of four having the following functions:

(a) DS terminals to indicate which of the four grade of destination switches is to be used.

(b) G terminals to indicate to the calendar-translator circuit the grade of the desired destination.

(c) D terminals to electrically mark, for example by applying battery, the desired vertical level in the seized destination switch, for hunting purpose.

(d) S terminals for responding to the calendar-shift circuit.

Whereas the terminals of the banks G, DS and D are individually strapped per connector circuit, the terminals of the bank S are in multiple for all connector circuits.

(3) "Destination Switches" each consisting of a group of relays and a two-motion step-by-step switch. Only one destination switch is engaged during any connection. The particular destination switch to be engaged, is indicated by the first two digits to which the connector responds. The vertical setting of the connector switch grounds one of nine vertical level marking wires D1–D9 which control the vertical stepping magnet of the destination switch in the well-known manner. The destination switch is set in its final horizontally-stepped position under the control of the calendar-translator circuit which electrically marks the horizontal position where the brushes of the destination switch must stop. These brushes hunt for this marked position in the same way as a line-finder hunts for a calling line. All the recorder-playback units are connected to respective sets of terminals in the contact banks of the destination switches. Each contact set comprises four contacts, designated respectively A, B, Play, Mark. The A and B terminals are used to complete the speech transmission circuit; the Playback terminal is used to start the motor of the recorder-playback unit; and the Marking terminal is used to indicate where the destination switch must stop in its horizontal hunting motion. When the destination switch establishes a connection toward a recorder, it does not make that recorder busy for other destination switches. The seized destination switch and the seized recorder remain in circuit for the duration of the call, and are released when the reservation agent releases the connection.

*Calendar-translator circuit*

The purpose of this circuit shown in detail in Figs. 5A and 5B is to set the selected destination switch chosen by the connector switch on to the particular set of bank contacts of the destination switch to which the required recorder is connected. This calendar-translator circuit works in conjunction with a calendar-control circuit shown in detail in Fig. 6 which is common to all connectors and all destination switches. The calendar translator circuit includes a set of translator relays DAY, TW, TH, W, CA and a pair of single-motion step-by-step switches 8, 9 (Fig. 5), which receive respectively the 3rd and 4th digits of the four-digit code to translate these digits in accordance with the grade-of-destination and also in accordance with the time intervening between the dialing date and the reservation date to electrically mark the particular horizontal contact set in the chosen destination switch to which the appropriate recorder unit whether daily, weekly, etc. is connected. The switch 8 referred to herein as the weekly switch, comprises four separate banks of contacts WS–1, WS–2, WS–3, WS–4, and respective rotary brushes, each brush being connected to the cross-strapped terminals in the bank of the connector switches in accordance with the grade of the destination. In this way the seized connector switch indicates to the calendar-translator circuit the grade of service which is required. Switch 9 referred to herein as the "day" switch, functions in conjunction with the calendar-control circuit and with the weekly switch to electrically mark the particular terminal in the destination switch to which the required recorder-playback unit is connected. As soon as the 3rd and 4th digits are received in the calendar-translator circuit, a check is made in accordance with the grade-of-destination and in accordance with the number of days from the dialing date to the reservation date to determine the operation of one or more translator control relays in the calendar-translator circuit. The day switch 9 includes three separate banks DS–1, DS–2, DS–3, which cooperate with the calendar-control circuit of Fig. 6 to determine which one of the translator control relays is to be operated. This day switch also includes three additional contact banks DS–5, DS–7, DS–6, and the return-to-normal bank DS–8. The bank DS–5 has seven of its successive contacts multipled to corresponding seven contacts in the selected destination switch so that when the brush of DS–5 is in contact with any of these seven contacts, it causes the selection of a recorder-playback unit having a daily record thereon. Similarly, seven of the contacts of the bank DS–6 are strapped in two combinations which are respectively connected to two contacts in the destination switch connected to two recorders allotted to the two parts of a week. A typical multipling to a grade #1 switch is shown in Fig. 7, and to a grade #2 switch in Fig. 8. Likewise seven of the bank contacts of the arc DS–7 are strapped in predetermined combinations and connected to the respective terminals on the destination switch to which respective tri-weekly recorder-playback units are connected (see Fig. 9). The twice-weekly, thrice-weekly, weekly, and "balance" recorders which are connected to respective contacts in the destination switches, are selectively marked by the week switch 8 and the appropriate one of the translator relays CA, TW, W, TH, (Figs. 5A and 5B).

Every day of the week (counting from 4 a.m. of Sunday of the current week), as passed, is marked on the calendar-translator circuit by a common calendar-control circuit. The count starts from 4 a.m. so that when the translator circuit receives the digits corresponding to the reservation date, it knows whether or not the information for that date has been recorded currently on the appropriate recorder. The calendar-translator circuit is also arranged to interchange every alternate week, the electrical marking at the destination switch terminals for daily recorders of grade #1 destination. Thus when the current week is passed, the daily recorders of the week subsequent to that current week, which during said passed week were formerly reached by dialing 2, will now become daily recorders for a new current week and will be reached by dialing 1. A relay CA in the calendar-translator circuit is operated during alternate weeks from the common control circuit. The relay CA is necessary because the dialing code used requires the reservation clerk to dial 1 (as the third digit) for a reservation date in the current week, 2 for the following week, etc., although certain recorders are used for the same reservation date over a two-week period. For example, on a grade #4 destination, there is a weekly recorder provided for each of the first two weeks. To listen to the second of these recorders during the current week, the clerk dials "2" as the third digit. On the following Sunday, the same seven reservation dates are covered by this same recorder, but the clerk will dial "1" to reach it. To permit the clerk to reach the same recorder by dialing a different week digit, the CA relay is provided.

In the event that the banks of the destination switch are limited in number, for example ten per bank, it may be necessary to carry-over the marked contacts to other levels. For example in the case of grade #1 destinations, seventeen recorders are used, ten of these recorders may be reached through one level of a destination switch, for example an odd-numbered level, and the remaining seven may be reached through another level, e. g. an even level. For this purpose special level transfer control relays E and F and G are provided, and which function when the brushes of the destination switch must be directed to this supplemental or even level.

*Common calendar-control circuit*

This circuit is shown in detail in Fig. 6. It consists of a single-motion switch having eight different arcs or banks of contacts. The brushes of this switch are arranged to be operated automatically, once per twenty-four hours at 4 a. m., from a suitable electric clock. The switch brushes have fourteen positions, and they remain in each position for twenty-four hours. During every alternate week this switch provides over one of its brushes a ground to operate the CA relays in the various translator circuits.

*Calendar-shift marking circuit*

This circuit is used to provide an indication to the calendar-translator circuit when the recorders for a given destination have had their records duly revised by the recording attendant to bring them up-to-date as daily, tri-weekly recorders, semi-weekly, or weekly recorders as the case may be.

*Record change indicator control circuit*

This circuit comprises a multi-bank step-by-step switch which is advanced one position at 4 a. m. of each day under control of a suitable clock. The contacts of the various banks are multipled to the recording attendant's equipment to control the lighting of the various lamps representing the various recorder-playback units for each destination so that each day the attendant is provided with an indication as to which units are ready for revision of their records.

*Detailed descriptions*

As pointed out hereinabove, each destination is represented by a four-digit code number; the first two digits controlling the coordinate setting of the brushes of a connector switch in the well-known manner to select the proper destination; the third digit represents the week containing the reservation date; and the fourth digit represents the reservation day itself. In order to make up the code for the third and fourth digits, it is necessary to have some basic daily reference. For this purpose the current week containing the dialing date will be represented by the number 1; the next succeeding week after the current week will be represented by the number 2; and so on for the successive weeks of the ten-week period. The fourth digit of the four-digit code will vary from 1 to 7, depending upon the day of the week, with Sunday represented by number 1, Monday by number 2, etc. However, since the period between 12 midnight and 4 a. m. of of each day is used for revision of the recorded information by the recording attendant, the various reservation clerks are instructed to consider the week as beginning on Sunday morning at 4 a. m. for the purpose of determining the week digit to be dialed.

Fig. 3 shows a form of shiftable calendar which may be provided for each reservation clerk so that he can expeditiously determine the third and fourth digits. This calendar may comprise a cardboard or similar member 12 having a window 13 past which is slidable a weekly calendar sheet 14. In the case of a ten-week reservation period, the window will have a length so as to accommodate for any desired setting of sheet 14 a ten-week calendar sequence. The margin of window 13 adjacent to the left-hand edge, bears ten digital markings 1 to 0; and the upper margin of the window, bears seven digital markings 1 to 7 representing respectively the seven days of the week. Throughout this description it will be assumed that the "current week" begins on Sunday, February 13th, so that at 4 a. m. of Sunday, February 13th, the sheet 14 is positioned by the reservation clerk to bring the date February 13th into horizontal alignment with the left-hand digit number 1. Assuming that the reservation date is February 13th, then the third and fourth digits of the code would be 1—1; likewise the third and fourth digits for a reservation date of February 19th would be 1—7; and likewise the the code digit for March 2nd would be 3—4.

Referring to Figs. 1, 4 and 14, and assuming the calendar of Fig. 3 is set as shown, and further let it be assumed that the dialing date is February 13th, between 4 a. m. and the following midnight, and the reservation date is February 28th to Chicago which may be a grade #1 destination whose first two code digits may for example be 1—3, and whose third and fourth digits would then be 3—2. The reservation clerk would, therefore, dial 1—3—3—2. Since the destination is a grade #1, the brushes of switch 10 will be stepped to the appropriately electrically marked level, and there will for example be ten sets of bank contacts in this level with four contacts A, B, PLAYBACK, and M (see Fig. 7) in each set. For example (see Fig. 7) the 4th to the 10th contact sets will be connected to respective daily recorder-playback units Nos. 1—7 upon which the corresponding daily records have been previously recorded; the first contact set in this level will be connected to the first weekly unit #15 upon which is recorded the information for the entire third week; the second contact set in this level will be connected to the second weekly unit #16 containing the information for the fourth complete week, and the third contact set in this level will be connected to the "balance" unit #17 containing the information for the six remaining weeks. Consequently under the above-assumed condition (Code 1—3—3—2), the #1 contact-set in the marked level, e. g. #1 level of switch 10 (see Fig. 7), will be electrically marked for example by battery potential, over conductor GR—1 (Fig. 5) and switch 10 will hunt in the well-known manner until this first contact-set is reached, whereupon there is connected into the talking circuit recorder-playback unit #15 upon which has been previously recorded the entire information for the third week. If the destination were a grade #2 destination, the hunting marking potential for the destination switch would be applied over conductor GR2; for a grade #3 destination it would be applied over conductor GR3; and for a grade #4 destination it would be applied over conductor GR4.

If the dialing date were February 14th, and assuming the same reservation date February 28th, switch 11 would be on its #2 bank contacts, and conductor C1 would be grounded. However, the circuit for operating relay DAY would be broken at the 9th and 10th contacts of relay SH. Consequently the same circuits above described would be effective to mark terminal H1 resulting in the connection of the #15 weekly recorder. Thus the same code 1—3—3—2, if dialed on February 13th or 14th for a reservation date in the third week more than fourteen days in advance, would result in the seizure of the same weekly unit #15 connected to the first contact-set of switch 10 and which contains a weekly recording for the entire third week.

If, on the other hand, the dialing date were February 15th, then obviously the #1 and #2 daily recorder-playback units would now contain obsolete information. However, in the four hour period between midnight and 4 a. m. of February 15th, the recording attendant would have replaced the record on units #1 and #2 with the daily information respectively for February 27th and for February 28th which is the reservation date that has been assumed. Therefore, when this same code 1—3—3—2 is dialed on February 15th, daily recorder #2 instead of weekly recorder #15 would now be seized, and containing only a daily record of the information pertaining specifically to February 28th as meanwhile recorded thereon by the attendant. Consequently, when the code 1—3—3—2 is dialed on any day during the current week, and the reservation date is less than fourteen days from the dialing date, the translator control relay DAY operates and a daily recorder-playback unit will be seized containing only daily information for the reservation date. This result is controlled by the selective setting of switch 6 as determined by the first two digits of the dialed code, and by the conjoint action of the regularly daily advancing calendar control switch 11, as well as by the final two pulses which set switches 8 and 9 to cause the destination switch 10 to automatically hunt for a daily recorder which contains the correct information for the reservation date.

Similarly, if the dialing date had been February 21st and the same reservation date February 28th were required, the dialed code would be 1—3—2—2, since under this assumption the current week instead of begining on February 13th would begin on February 20th and the weekly code digit would be "2" instead of "3." As a result of dialing 1—3—2—2 on February 21st, the settings of the various automatic switches would cause the seizure of daily recorder #2 having the daily record for February 28th, assuming, of course, that by February 21st recorder #2 has had its information revised by the recording attendant to incorporate the correct information pertaining to February 28th.

Similarly, if the dialing date had been February 27th and the reservation date February 28th, the code would be 1—3—1—2, and the #2 daily recorder would be seized containing the revised daily information pertaining to February 28th. In other words, the third digit of the code will be dependent upon the number of weeks separating the week containing reservation date from the current week. Since for a grade #1 destination, there are fourteen daily recorder-playback units allotted to the current week and to the next succeeding week, if the actual number of days intervening from the dialing date to the reservation date is less than fourteen, the appropriate daily recorder-playback unit will be seized containing only daily information. Or to put the matter another way, for a grade #1 destination when the number of days from the dialing date to the reservation date is fourteen or greater, a weekly recorder or a "balance" recorder will be seized.

It will be appreciated, therefore, that the switches and circuits are so designed as to provide a maximum usability and time-saving factor for the recording and playback system as a whole.

As will be described hereinbelow, provision is also made in the event that the dialing for a reservation date should take place during the portion of the day, e. g. 12 midnight to 4 a.m., when the recording operators are replacing the obsolete records. If the record has actually been replaced at the time of dialing, or if the record has not been replaced at that time, the proper recorder-playback unit will be automatically selected containing accurate information for the desired date, the only difference being that if the record has been duly replaced, the reservation clerk will be obliged to listen to a much shorter record, for example a daily record, as compared with a tri-weekly, semi-weekly, or weekly record.

*Typical grade #1 destination selection*

Fig. 4 is a more detailed schematic layout of a complete system wherein the parts which are the same as those of Fig. 1, bear the same designation numerals. Throughout the drawings, it is understood that wherever a circle containing a negative sign is shown, it represents the negative ungrounded terminal of a common D. C. source such as a battery, and wherever a circle containing a positive sign is shown, it represents the grounded positive terminal of this same source or battery. It will again be assumed the dialing date is February 13th and the reservation date is February 28th (code 1—3—3—2). It will also be assumed that the telephone connection has been extended in the well-known manner through the line-finder 4 to the connector 6, and that in response to the dialing of the first and second digits, the brushes S, G, D and DS of the connector are stepped to the corresponding vertical row and to the corresponding horizontal contact-set in that row under control of the pulse relay P and the vertical and horizontal stepping magnets VM and HM and the conventional change-over circuit. The switches 4 and 6 are maintained in their set position in the well-known manner by suitable holding relays controlled over the subscriber's loop. The selected terminal in bank DS electrically marks a corresponding grade #1 destination switch 10, and a starting circuit is prepared for the vertical stepping magnet VM of that switch, causing, after four digits have been dialed, its four brushes to move vertically to the appropriate contact level as determined by the setting of the connector switch. The various contacts in the banks G are cross-connected, so that depending upon the grade of the particular destination dialed, marking battery is connected to the corresponding conductor GR1—GR4. It will be observed that the various levels of the connector switch are provided with respective identifying conductors D1—D9, which are connected through the contacts of a transfer relay G (Fig. 5B) to corresponding level identifying wires V1—V9 of the destination switch. The function of the relay G is to take care of a situation where the destination switch has only ten contact-sets per level, in which event more than one level will be required to accommodate the seventeen recorder playback units for the grade #1 destinations, and to accommodate the eleven recorder units for the grade #2 destination. Accordingly, as shown in Fig. 7, the #1 to #7 daily recorders, as well as the two weekly recorders and the "balance" recorder, may be allotted to an odd numbered level in the destination switch. The remaining daily recorders #8–#14 may be allotted to an even-numbered level. Likewise in the grade #2 destination switch (Fig. 8) the daily recorders #1–#7 as well as the two weekly recorders and the "balance" recorder can be allotted to an odd-numbered level, and the remaining two semi-weekly recorders can be allotted to an even-numbered level. It will be assumed that for the given dialing date the second set of daily recorders #8–#14 on grade #1, and the semi-weekly recorders on grade #2 are used during the second week for which the code digit would be "2." This fact is used to control the choice of level, whether odd or even, as will be described hereinbelow. Thus, by means of the identifying wires D1—D9, the particular vertical level in the destination switch to which the desired recorder is connected can be electrically marked, and this destination switch can automatically hunt under control of its vertical stepping magnet VM for the proper marked level in the well-known manner. Any well-known change-over relay is provided in the destination switch to transfer the hunting circuit from the vertical stepping magnet to the horizontal stepping magnet HM of that switch. The receipt of the weekly digit in this case "3," causes the weekly switch 8 (see Figs. 5A and 5B) to step. The first pulse of this weekly digit closes a circuit traceable over the pulsing wire PLS, winding of slow-release relay "A," 8th and 9th contacts of relay "C," winding of stepping magnet "WS" to negative battery. Magnet WS pulls up but does not begin to step the brushes WS–1—WS–8 until the subsequent de-energization of WS upon the cessation of the first pulse. When relay A operates, it closes the circuit from positive battery, 6th and 7th contacts of relay A, 29th and 28th contacts of relay C, winding of relay B, to negative battery. Relay B operates and holds over its own 11th and 12th contacts to the holding wire H. After the cessation of the first pulse, magnet WS de-energizes and steps the brushes of switch 8 to the #1 contact-set. Also the off-normal relay WON is operated through brush WS–8 to close the normalizing circuit for switch 8 to restore its brushes to its home position upon the final release of relays B and C after the established telephone connection is broken down. In the conventional way, therefore, the brushes of switches 8 are stepped to their #3 contact set under control of the three successive pulses applied to WS.

At the end of the third digit, slow release relay A releases and closes a circuit for operating relay C via the 5th and 6th contacts of relay A, and the 9th and 10th contacts of relay B. Relay C operates and locks to the holding wire H. Relay A reoperates in response to the first pulse of the fourth digit, and in doing so it causes release of relay B, and since relay C is now operated, these pulses are transferred via the 9th and 10th contacts of relay C to the stepping magnet DS of the day switch 9. The brushes DS–1 to DS–8 of switch 9 are therefore stepped to their #2 contact sets. As soon as switch 9 goes off normal relay DON operates. At the cessation of the fourth digit pulses, relay A releases and switch 9 stays put in its stepped position. With relays A and B released, a circuit is closed for operating relay D from negative battery, winding of relay D, 12th and 11th contacts of relay C, 8th and 9th contacts of relay B, 5th and 6th contacts of relay A to positive battery. Relay D remains operated until the established play-back connection is broken down.

Associated with switches 8 and 9 are five translator relays CA, DAY, TW, TH and W, the selective operation of these relays being determined by the joint setting of switches 8 and 9 and the calendar control switch 11 (Fig. 6). While Fig. 6 shows the switch 11 consisting of two separate banks of fixed contacts, namely A–1, A–3, A–5, A–7 and A–8, and B–1, B–3, B–5, B–7, and B–8, with their respective rotary brushes and with two respective stepping magnets CSM–1, CSM–2, it will be understood that all these banks of contacts and brushes may be incorporated in a single switch and with a single stepping magnet. Since we have assumed a dialed code 1—3—3—2, and since we have assumed the dialing date to be Sunday, namely February 13th, all the brushes of switches 11 will be on their #1 contacts and no operating circuit is provided for relay CA which remains normal. It will be observed that all the brushes of switch 11 are connected directly to ground. A circuit will then be completed from marking battery over conductor GR1, brush WS–1, and its bank contact #3, 6th and 5th contacts of relay DAY, 26th and 25th contacts of relay CA, to terminal H1 on the selected vertical level of contacts in the seized grade #1 destination switch. A circuit is then closed in the well-known manner through the horizontal stepping magnet HSM of the destination switch 10, causing the brushes of that switch to step along the previously selected vertical level until they find the marked contact H1. When this terminal is found, a suitable relay CON operates to complete the voice circuit from the recorder #15 through brushes A and B, contacts of relay CON, through the appropriate line amplifier LA, connector switch 6, line finder 4 to the line 5. At the same instant, a suitable potential is applied to the playback wire of the selected contact set to start the motor of the #15 recorder unit to cause it to play back its recorded information to the reservation clerk. In the conventional manner, all the switches which are engaged during the playback period and the associated relays are held in operative position, via the extended holding wire H. When the reservation clerk has obtained the desired information and replaces his telephone receiver, the relay C releases and closes an automatic normalizing circuit for switches 6, 8, 9 and 10. Since such normalizing circuits are well-known in the automatic telephone art, detailed description thereof is not believed necessary herein. However, switch 11 has no normal position and continues to advance one step each twenty-four hours.

If the same reservation date (February 28th) had been dialed on Monday, February 14th of the current week, then the brushes of switch 11 would at 4 a.m. on Monday, February 14th, be automatically stepped from the #1 position to their #2 position under control of a daily pulse transmitted from a recurrently operating clock circuit via the terminals PA, PB, whereby a ground is placed upon these terminals to operate the stepping magnets CSM-1, CSM-2. Of course, for the assumed reservation date of February 28th, the same code 1—3—3—2 would again be dialed. The bank contacts of switch 11 are cross-connected to a set of seven conductors C1—C7, and these conductors are selectively grounded in accordance with the setting of switch 11. Thus, with switch 11 in position #2, and with the same dialed code 1—3—3—2, it will be found that while conductor C1 is grounded, the circuit for relay DAY is still open at the contacts of relay SH, so that the above described operation resulting in the electrical marking of terminal H1 in the destination switch again takes place and the same weekly recorder is connected into the listening circuit.

Let it now be assumed that for the same reservation date (February 28th) and the same destination, the dialing is done on February 15th instead of February 4th. It will be clear then that the #2 daily recorder-playback unit previously used for Monday, February 14th, would have obsolete information thereon. As will be described hereinbelow, the recording attendant has a panel with indicator lights, one for each destination and one for each of the dialy recorders, weekly recorders, etc. allotted to such destination, as well as microphone jacks for each of the recorders. Sometime between midnight and 4 a. m. of each day, the recording attendant revises the information on those recorders containing obsolete information. Thus, between midnight and 4 a. m. of February 5th, the attendant should have revised the record on the #2 daily recorder unit connected to terminal H1 in the destination switch so as to record thereon only the complete daily information corresponding to February 28th. In other words, the attendant always keeps, in the case of a grade #1 destination, fourteen daily recorders up to date for the next ensuing fourteen days.

For the present, it will be assumed that between midnight and 4 a. m. of February 15th, the recording attendant has duly revised the record on the recorder unit #2 connected to terminal H1 in the destination switch. However, switch 11 at 4 a. m. Tuesday morning has had its brushes automatically stepped so that they are now resting on their #3 bank contacts. In this position, it will be found that conductors C1 and C2 are grounded, and a circuit is traceable from the normally grounded brush A3 and its #3 bank contact, conductor C2, 8th and 7th contacts of relay S, brush DS-1 and its #2 bank contact, 27th and 28th contacts of relay D to relay DAY which operates. It should be observed that relay D was previously operated and remained operated after the dialing of the four digits, via the 5th and 6th contacts of relay A, 8th and 9th contacts of relay B, and 11th and 12th contacts of relay C. With relay DAY thus operated, marking battery is extended from conductor GR1, brush WS-1 and its #3 bank contact, 6th and 7th contacts of relay DAY, 6th and 5th contacts of relay CA, brush DS-5 and its #2 bank contact, to electrically mark the terminal H1 in the destination switch. This switch, therefore, hunts until it finds that marked terminal to which #2 daily recorder is connected, this particular recorder having on it the revised record pertaining to February 28th. In other words, while the same code 1—3—3—2 had been dialed, a recorder having a daily playback record is now seized.

It should be observed that the two relays S and SH can only be operated between midnight and 4 a. m. under control of the recording attendant, as will be described hereinbelow. It may very well happen that the dialing for a reservation date may take place between midnight and 4 a. m., the period used for revision of the records. Provision is automatically made therefore, so that if the number of intervening days between the dialing date and the reservation date is such as to otherwise provide for a shorter type record, for example a daily record, such a daily record will be connected in circuit if the revision has been made at the time of dialing, but if the revision has not been made, a longer type record may be connected in circuit, for example a semi-weekly, weekly or "balance" record. To illustrate this situation, let it be assumed that the dialing takes place at 1 a. m. on Tuesday, February 15th, for a reservation date of February 28th. Assuming that the attendant has meanwhile revised the record on the daily recorder #2 corresponding to February 28th, in that case relays S and HS will operate when a call is placed, as will be described hereinbelow, and a circuit can be traced through brush A-1 which is still on its #2 contact, grounding conductor C1 and operating relay DAY. This will result in the marking of terminal H1, as already described, causing the destination switch to connect in circuit the appropriate #2 daily recorder which now contains the correct daily information for February 28th. If, however, upon dialing at 1 a. m. the attendant had not revised the record on #2 daily recorder, relays S and SH would be normal. Consequently, while conductor C1 will be grounded, there would be no circuit for operating relay DAY, so that instead of seizing #2 daily recorder with the information for February 28th, the terminal H1 would be marked, causing the selection of a weekly recorder #15 containing the complete weekly information for the week including February 28th.

If it is assumed the dialing had taken place on February 16th, after 4 a. m., switches 8 and 9 are respectively set upon the same contacts #3 and #2. However, at 4 a. m. of February 16th, the switch 11 has had its brushes automatically stepped to the #4 position. In this position it will be found that conductors C1, C2 and C3 are grounded. However, only conductor C2 is effective, since it is connected to the #2 contact via the back contact of relay S. Consequently the relay DAY will again be operated and the same terminal H1 on the destination switch will be electrically marked, and the same #2 daily recorder will be connected in circuit.

Let it now be assumed that the dialing date is February 13th and the reservation date is February 21st instead of February 28th, then the complete code number for February 21st (still assuming a grade #1 destination), would be 1—3—2—2. The system would function as above described, except that now switches 8 and 9 would be respectively on their #2 bank contacts, and since the reservation date is within less than fourteen days of the dialing date, #9 daily recorder will be seized, having thereon a daily record corresponding to the reservation date of February 21st (see Fig. 14). Thus battery will be extended from conductor GR1, brush WS-1 and its #2 bank contact, 9th and 8th contacts of relay CA, winding of relay F which operates and connects marking battery through resistor R2, 12th and 11th contacts of relay F, brush DS-5 and its #2 bank contact to conductor H7 in the even level of switch 10, which causes the destination switch to seize the #9 daily recorder allotted to the desired reservation date of February 21st. It will be observed that when relay F operated it caused the operation of level transfer relay G which transfers the "odd" marking wires D1—D9 from the connector, to the "even" level-marking wires V1—V9 at the destination switch. Thus the contact set H7 in the even level of the destination switch is marked and not the H7 contact set in the odd level. It will be observed that under the above conditions, the relay DAY is operated. The function of this relay is to indicate to the calendar translator circuit whether the reservation day is in the first or second portion of the reservation week, these portions being defined by the particular portion of the current week in which the dialing date occurs. Thus, if the dialing date is a Tuesday, the first part of the week in the reservation week will be from Sunday or Monday, and the second part will be from Tuesday through Saturday. It is important that the calendar translator circuit know therefore whether the rservation day is Sunday or Monday of the reservation week, or is a Tuesday through Saturday of the reservation week. This is necessary since, whether or not a daily record unit will be seized, is fixed by the maximum number of days for which individual daily records are provided. Thus, since fourteen daily recorder units are provided on grade #1, if then a weekly digit 3 is dialed, and if for example the dialing is done on a Tuesday, it is necessary that the calendar translator know whether the reservation date occurs on Sunday or Monday of the third week or Tuesday through Saturady. If the reservation day is in this so-called first part of the reservation week, the relay DAY operates. If it is in the second portion, the relay DAY does not operate. It will be understood of course, that the same principles hold regardless of the day of the week on which the dialing occurs.

*Reservation date more than three weeks in advance (grade #1)*

The above descriptions have referred to the operation of the apparatus when the reservation date is within three weeks of the dialing date. It will now be assumed that the reservation date is more than three weeks after the dialing date, for example if the current week begins on February13th and the reservation date is March 7th, the dialed code would be 1—3—4—2. The switch 11 will have its brushes stepped so that they are on the bank contacts representing the number of days elapsed since the beginning of each 2-week period. Therefore, with switches 8 and 9 respectively on their #4 and #2 bank contacts, battery is extended from conductor CR-1, brush WS-1 and its bank contact number 4, 29th and 28th contacts of relay CA, to terminal H2. This causes the destination switch to hunt for terminal H2 where it stops and connects in circuit the weekly recorder #16 for the fourth week. If the dialing is done on either February 13th or 14th relay DAY remains normal and the wire H2 alone is electricaly marked by the marking battery through the brush WS-1, also causing the weekly recorder unit #16 for the fourth week to be connected in circuit. If the dialing is done on any other day of the current week the relay DAY operates but here again since brush WS-1 is on its #4 contact set only the conductor H2 is marked. In other words no matter on what day of the current week the dialing is done, only the weekly conductor H2 will be marked when the reservation date is in the fourth week. Likewise if the dialing is done during the week of February 20th, for a reservation date between March 6–12 relay CA will be operated by reason of the brush B–5 placing a ground on conductor C–7 thus resulting merely in the marking of conductor H1 instead of H2 which will cause the weekly recorder unit #15 to be connected in circuit. It is believed that the operation of the system will be clear if the reservation date is in the fifth or any other week subsequent to the current week. Since there are only three recorders used for the third to the fourteenth weeks in a grade #1 destination (see Figs. 2 and 14), only three such marking conductors H1, H2 and H3 are required. When the destination switch finds a contact set H3 corresponding to a third digit of 5, this contact set has connected to it a "balance" recorder covering the information for the fifth to the tenth weeks.

*Typical grade #2 selection*

All the foregoing descriptions have related to a grade #1 destination. Descriptions will now be given of the operation in connection with a grade #2 destination. As will be seen from Figs. 2 and 15 the main difference is that daily records are provided only for the first seven days of the current week. It will again be assumed that the current week begins on February 13th but that the reservation date is February 19th, and it will be assumed that the particular grade #2 destination is represented by the first two code digits 2—5. Therefore the complete code to be dialed would be 2—5—1—7. As a result of the dialing of 2—5, the line-finder 4 and connector 6 operate to select the proper destination switch (Fig. 8). In this case the connector switch will apply marking battery to conductor GR2 (Fig. 5A). Switch 8 will have its brushes set on the #1 bank contacts, and switch 9 will have its brushes set on the #7 bank contacts. Switch 11 will be resting on its #1 bank contacts, wherein none of the conductors C1—C7 is grounded and none of the translator control relays is operated. Accordingly, battery is extended from conductor GR2, brush WS-2 and its #1 bank contact, brush DS-5 and its #7 bank contact, to mark terminal H5 in the seized destination switch to cause that destination switch to hunt for this particular set of marked bank contacts to which the proper daily recorder is connected.

If the reservation date were February 23rd and the dialing date were February 13th, the code number would be 2—5—2—4. Switch 11 would still be on its #1 bank contacts, with none of the conductors C1—C7 grounded, and switches 8 and 9 would respectively be on their #2 and #4 bank contacts. Battery will then be extended over conductor GR2, brush WS-2 and its #2 bank contacts, 9th and 8th contacts of relay DAY, to ground through the winding of relay E. Relay E operates and connects marking battery through the resistance R2 and through its 12th and 11th contacts, brush DS-6 and its #4 contact set, to mark terminal H9 causing the grade #2 destination switch to hunt for this particular terminal to which is connected a semi-weekly recorder containing the information for Sunday, Monday, Tuesday and Wednesday of the second week. However, as shown in Fig. 8, the seven daily recorders, and the two weekly recorders as well as the balance recorder are connected to the odd level in the destination switch, while the two semi-weekly recorders are connected to contacts in the even level. Consequently, when relay E operated it caused relay G to operate, thus transferring the vertical stepping marking wires of the destination switch from odd to even levels. Thus the first semi-weekly recorder is electrically marked by conductor H10. If the reservation date had been February 24th, which would be in the second half of the second week, the code would be 2—5—2—5, and the same circuit as above described would be traceable except that brush DS-6 would be on #5 bank contact and would electrically mark terminal H10 in the grade #2 destination switch to which is connected a semi-weekly recorder containing the information for Thursday, Friday and Saturday of the second week. Likewise if the reservation date had been March 3rd, the code would be 2—5—3—5, and battery would be extended from terminal GR2, brush WS-2 and its #3 bank contact, 6th and 5th contacts of relay TW, 26th and 25th contacts of relay CA, to terminal H1, marking this terminal and causing the grade #2 destination switch to hunt for it. This terminal would have a weekly recorder connected thereto containing the information for the week including March 3rd.

Descriptions of the grade #2 destination have been on the assumption that the dialing took place on the first day of the current week, so that if the number of days from the dialing date to the reservation date is less than seven, a daily record recorder will be seized. If there are seven or more days from the dialing date to the reservation date, either a semi-weekly, a weekly, or a "balance" recorder, will be seized. For example, if the dialing date were February 18th and the reservation date were February 23rd (and therefore code 2—5—2—4), the switch 11 would find its brushes on the #6 contact sets, thus grounding conductors C1 to C5. The ground on conductors C4 would be effective, since switch 9 is on its #4 contact set, to cause relay DAY to operate. Under this condition the battery from conductor GR2 would be extended through brush WS-2 and its #2 bank contacts, 9th and 10th contacts of relay DAY, brush DS-5 and its #4 contact set, to terminal H9 which when seized by the destination switch connects a daily recorder in the circuit.

As will be seen from the strapping of the first four contacts of banks DS-2, relay TW only operates when dialing takes place on Thursday, Friday or Saturday since under those conditions only the ground on conductor C4 is effective to operate relay TW. Consequently, if dialing takes place on Sunday, Monday, Tuesday or Wednesday, relay TW is normal and the terminal H1 is marked by battery GR2 to cause the seizure of the first weekly recorder. If dialing takes place on Thursday, Friday or Saturday, relay TW is operated and the marking battery GR2 is extended over contacts 6, 7, of relay TW to operate relay E. Relay E in turn marks either terminal H9 or H10 depending upon whether the reservation date is in the first or second portion of the week.

It will also be understood that relay TW is operated if dialing takes place early Sunday morning between midnight and 4 a. m., provided the recording attendant has meanwhile revised the record on the appropriate recorder. This particular operation of relay TW is independent of what reservation date is dialed. However, relay TW is only effective under this condition if the reservation date is in the second week so as to determine which of the two semi-weekly units 8, 9, is seized, this of course being determined by the setting of brush DS-6.

*Typical grade #3 selection*

As will be seen from Fig. 2, this grade of destination has three recorders allotted for the current week. If the dialing date is assumed to be February 13th and the reservation date is for example February 14th, and assuming the first two identifying digits for grade #2 destinations are 3—7, then the complete code for that particular reservation date would be 3—7—1—2. Switch 11 will be on its #1 contacts and switches 8 and 9 will respectively be on their #1 and #2 contacts. Since none of the C1—C7 wires are grounded, none of the translator control relays will be operated. Consequently, the marking battery will be extended from conductor GR3, over brush WS-3, and its #1 bank contact, brush DS-7 and its #2 bank contact to terminal H5 to cause the destination switch (Fig. 9) to hunt for the corresponding bank contact set to which a tri-weekly recorder is connected. As will be apparent from the strapping of the #1 and #2 contacts at switch bank DS-7, this same recorder would be seized if the reservation date were February 13th or 14th. Likewise, if the reservation date were either February 15th, 16th or 17th, contacts #3, #4 and #5 of bank DS-7 are strapped together and also to marking contact H6 in the destination switch, with the result that that switch will seize another tri-weekly recorder containing the record for these three days. Similarly, if the reservation date were February 18th or 19th, the brush DS-7 would engage either strapped bank contacts #6 or #7 which are connected to marking contact H4 causing the destination switch to hunt for the corresponding contact set to which a tri-weekly recorder containing the record for February 18th and 19th. It will now be assumed that the reservation date is in the third week, for example March 1 with the same dialing of February 13th so that the code for that date would be 3—7—3—3 in which event marking battery will be extended over conductor GR-3, brush WS-3, and its #3 bank contact, 29th and 28th contacts of relay CA to mark terminal H2. The destination switch therefore hunts for this terminal and when it seizes it, there is connected to the appropriate contacts of the seized set a weekly recorder allotted to the second week. Likewise, if the reservation date had been in the fourth week, for example March 10th, the dialed code would have been 3—7—4—5. In that event, marking battery would be extended over conductor GR3, brush WS-3 and its #4 bank contact, 6th and 5th contacts of relay W to mark terminal H3, causing the destination switch to hunt for this terminal and seize a "balance" recorder. If the dialing date had been some other day, for example February 18th, and the reservation date were for example February 24th (code 3—7—2—5), the switch 11 would be on its #6 contacts, causing the grounding of conductor C1, C2, C3, C4, C5. However, since switch 9 will be in position #5, only the ground on conductor C5 will be effective, causing relay TH to be operated through brush DS-3 and its #5 bank contact with relay TH. Thus marking battery from conductor GR3 is extended through brush WS-3 and its #2 bank contacts, 6th and 7th contacts of relay TH, brush DS-7 and its #5 bank contact to mark terminal H6. Terminal H6 causes the destination switch to select a tri-weekly recorder which contains a record for three days, rather than selecting a weekly recorder.

It will be seen, therefore, that the relay TH comes into effect on this grade of destination depending upon the relation between the dialing date and the reservation date in a somewhat analogous manner to the way in which relay TW does, and as described hereinabove.

It was mentioned hereinabove that if the destination switch is of a type wherein the various banks have only ten contact sets per bank and if the particular destination switch must accommodate more than ten recorders as is the case for grade #1 and grade #2, it is necessary to be able to use a full ten contact set bank and the balance of a remaining bank. This can be provided for by the appropriate connection of the connector-to-destination switch vertical marking conductors D1, D9, through the cooperation of transfer relay G. For example, if the desired recorder is connected to a contact set in an odd-numbered bank of the destination switch, the odd-numbered marking wires D1, D3, D5, D7, D9 (Fig. 5), will be selectively grounded and these will be connected through the corresponding normal back contacts of relay G to the corresponding odd vertical marking wires which control the vertical stepping of the destination switch. If, however, either relay E or relay F is operated, it will result in the energization of relay G via the 7th and 6th contacts of either relay E or relay F.

*Typical grade #4 destination*

For this grade of destination only three recorders are used (see Figs. 2 and 17). If the reservation date is any day during the current week, the third digit will be "1" and the fourth digit will be any number from 1 to 7. Brush B-3 of the calendar control switch applies ground to conductor C8, from 4 a.m. Saturday to 4 a. m. Sunday so that relay W cannot be operated except when SH operates between midnight and 4 a. m. Sunday. Consequently the marking battery for the destination switch will be extended from the connector switch 10 over conductor GR4, brush WS-4 and its #1 bank contact, 26th and 25th contacts of relay CA to terminal H1. This causes the grade #4 destination switch to hunt for the terminals to which is connected the first weekly recorder (see Fig. 10).

If the reservation date is during the second week, the third digit of the code would be "2", and the fourth digit would be from 1 to 7. The marking battery would then be extended from conductor GR4 over brush WS-4 and its #2 bank contact, 29th and 28th contacts of relay CA to mark terminal H2 in the destination switch. This causes that switch to hunt for and seize the recorder for the second week.

If the reservation date is in the third week, the third digit would be "3", and the fourth digit would be from 1 to 7, causing the "balance" recorder to be seized. If the reservation date is in the third week, and the dialing takes place between midnight and 4 a. m. on Sunday morning, this four hour period is considered a part of the preceding week, and assuming that the recording attendant has meanwhile replaced the record on the first weekly recorder with the information for Sunday to Saturday of the third week, then instead of seizing a "balance" recorder, the first weekly recorder is seized. The reason for this is that the brush B-3 of the calendar control switch 11 applies ground to conductor C6 and closes a circuit via 31 and 32 of SH to the winding of relay W.

*Calendar shift marking*

As mentioned hereinabove, the two relays S and SH (Fig. 5A) are provided so that if dialing for reservation information occurs between 12 m. and 4 a. m. of any day, the kind of recorder, whether daily, weekly, semi-weekly, etc., which will be seized will, under certain circumstances, be dependent upon whether the recording attendant has replaced an obsolete record with a current record on an otherwise available recorder.

For this purpose each of the terminals in the "S" bank of contacts in the connector switch (see Fig. 4) is connected to a corresponding wire SM leading from the calendar shift marking circuit (Figs. 11 and 12). As will be described hereinbelow, if the recording attendant has between 12 m. and 4 a. m. replaced the record on the appropriate recorders available for a dialed destination before dialing takes place, the appropriate SM wire will be grounded, and will close a circuit over the S brush of the connector to operate relay S. Immediately thereafter relay SH also operates. As an illustration of the effect of operation of these two relays, let it be assumed that the dialing date is February 15th of the current week and the reservation date is February 28th, and the code, assuming a grade #1 destination, would then be 1—3—3—2. Switch 11 will be in position #2, it being assumed that the dialing is between 12 m. and 4 a. m. of February 15th. Switch 11 does not apply ground to its #3 contact until 4 a. m. of February 15th. Thus conductor C1 is grounded and closes a circuit through brush DS-1 and its #2 bank contact to operate relay DAY, thus insuring that daily recorder #2 for February 28th is seized. If, under the same assumptions, the dialing had taken place between 12 m. and 4 a. m., and the attendant had not revised the record, relays S and SH would be normal. No operating circuit would then be provided for relay DAY, and weekly recorder #15 for the week including February 28th would be seized.

A similar action takes place on a grade #2 destination (see Fig. 15). For example, if the dialing date were February 15th (between 12 m. and 4 a. m.), and the reservation date were February 21st (for example code 2—4—2—2), and if the attendant has replaced the record on the #2 daily recorder of the first week with the daily information for February 21st, relays S and SH will be operated by ground over the SH wire. Switch 11 will still be in position #2, and relay DAY will operate causing marking battery to be applied to terminal H7 via the 9th and 10th contacts of relay DAY, brush DS-5 and its #2 bank contact. This results in the seizure of the #2 daily recorder having thereon the revised information for February 21st. If, however, the attendant had not replaced the record on the #2 daily recorder, relays S and SH would be normal, and relay DAY would not operate. Instead, therefore, of seizing a daily recorder, the twice-weekly recorder #8 containing the information for Monday through Wednesday of the second week, would be seized. Similarly, if the dialing date were February 19th and the reservation date were February 25th (code 2—4—2—6), and if the dialing is effected between 12 m. and 4 a. m. of February 19th, switch 11 is now in position #6, and if the recording attendant has revised the record on the second semi-weekly recorder #9 so as to contain only the information for the 26th of February, as well as the #6 recorder to contain the information for the 25th of February, then relays S and SH will be operated. Consequently, relay DAY again operates and extends the marking battery from GR2 through brush WS-2 and its #2 bank contact, 9th and 10th contacts of relay DAY, brush DS-5 and its #6 bank contact, to terminal H4. This connects in circuit the #6 daily recorder which now contains the information for the sixth day of the second week, namely the desired reservation date of February 25th. If the attendant had not in the meanwhile revised the record on this daily recorder #6, relays S and SH would be normal and relay DAY likewise would be normal, resulting in the operation of relay E and the seizure of the semi-weekly recorder #9 instead of the daily recorder #6.

The same principle of operation holds true for grade #3 destinations (See Fig. 16). For example, if the dialing date is February 15th of the current week, and the reservation date is February 21st of the second week (code 3—5—2—2), and if the dialing is done between 12 m. and 4 a. m. of February 15th, and also if the recording attendant has revised the record on the first tri-weekly recorder #1 to include the information for the first two days of the second week, relays S and SH will be operated. Switch 11 being in #2 position, causes the ground on conductor C1 to be extended through the 9th and 10th contacts of relay SH, brush DS-3 and its #2 bank contact, to operate relay TH. The operation of this relay extends the marking potential from conductor GR3 through brush WS-3 and its #2 bank contact, to terminal H5. As will be seen from Fig. 9, the marking of terminal H5 causes the seizure of the tri-weekly recorder #1 instead of weekly recorder #4. This tri-weekly recorder now contains the information for February 20th and 21st of the second week. If the attendant had not revised the record on the tri-weekly recorder #1, the relays S and SH would be normal and the ground on conductor C1 would not operate relay TH so that instead of seizing the tri-weekly recorder #1 by the grounding of conductor H5, the full weekly recorder #4 would be seized by the marking of contact H1 through the 6th and 5th contacts of relay TH.

*The recording attendant's calendar shift marking control*

In order that the recording attendant may properly replace and revise the records on the various recorders to keep them current from day to day, each attendant has an indicator and jack panel for each destination. Four of such panels are shown in Figs. 11 and 12, corresponding respectively to destinations of four different grades.

The grade #1 panel comprises a destination lamp 101 which identifies, when lighted, the particular destination allotted to this panel. It also includes a series of fourteen daily recorder lamps 102–115; two weekly recorder lamps 116, 117; and a "balance" recorder lamp 118. Beneath each lamp is a corresponding jack, designated 102a–118a. Each of these jacks is connected to a corresponding recorder-playback unit for this particular grade #1 destination, as explained above in connection with Fig. 2, and into each jack the attendant can plug a suitable recording microphone (not shown). Similarly, panel #2 corresponding to a grade #2 destination, comprises a destination lamp 119, seven individual daily recorder lamps 120—126, a first semi-weekly recorder lamp 127, a second semi-weekly recorder lamp 128, a first full weekly recorder lamp 129, a second full weekly recorder lamp 130, and a "balance" recorder lamp 131. Each of these lamps has also associated therewith a corresponding jack 120a–131a into which the attendant's microphone can be plugged. Similarly, the panel allotted to a grade #3 destination (Fig. 12) comprises a destination lamp 132, a two-day recorder lamp 133, a three-day recorder lamp 134, a two-day recorder lamp 135, a first full weekly recorder lamp 136, a second full weekly recorder lamp 137, and a "balance" recorder lamp 138. Each of these lamps is associated with a corresponding jack 133a–138a into which the recording attendant's microphone can be plugged. Likewise, the panel for a grade #4 destination comprises a destination lamp 139, a first full weekly recorder lamp 140, a second full weekly recorder lamp 141, and a "balance" recorder lamp 142. The weekly recorder lamps and the "balance" recorder lamp have associated therewith respective jacks 140a–142a, into which the attendant's recording microphone can be plugged.

Referring to the grade #1 panel (Fig. 11), all of the recorder lamps are connected to a common conductor 144, and thence to the sleeve of the destination jack 145. The attendant has a separate plug 146, the sleeve of which is connected to battery through a resistor 147 so that when this plug is inserted into the jack 145, it applies battery in parallel to all the recorder lamps. However, each lamp has an individual grounding conductor, arranged to be grounded sequentially under control of the "Record Change Indicator" control circuit shown on Fig. 13. This circuit comprises two step-by-step rotary switches, one switch consisting of the rotary brushes A-1, A-3, A-5, A-7, and A-8, with the associated stepping magnet A. The other step-by-step switch comprises the rotary brushes B-1, B-3, B-5, B-7 and B-8, with the associated stepping magnet B. It will be understood, of course, that instead of using two separate switches of five contact banks per switch and five brushes, a single switch having ten contact banks and ten rotary brushes can be used. For convenience in description, the ten sets of bank contacts and ten brushes will be referred to herein as switch 148.

All the brushes of switch 148 are automatically returned to their #1 contacts immediately after leaving #14 contact, since the bank contacts 15—20 are strapped together and thence through relays C and D which automatically operate the associated stepping magnets A and B, thus stepping the brushes back to their #1 positions. Each of the stepping magnets is arranged to be grounded at 4 a. m. of each day from a common clock-controlled circuit connected to the conductors PA, PB. This may be the same circuit that supplies the stepping pulses to the stepping magnets of switch 11 (Fig. 6). In other words, the brushes of switch 11 and switch 148 are daily stepped from position to position at the same instant. The bank B-3 has its first fourteen terminals individually connected to corresponding conductors D-1, D-14 (Fig. 11) which in turn are individually connected to the daily recorder lamps 102-115. It will be observed that all of the brushes of switch 148 are normally grounded. Consequently, between the period of 12 m. and 4 a. m. of each day, one of these fourteen conductors will find ground on it, depending upon the position of brush B-3. It will be assumed for purposes of explanation, that the first bank contact for brush B-3 represents the Sunday of the first week, and each of the successive thirteen bank contacts for this brush represents successively the remaining six days for the current week and the seven days of the next succeeding week. Consequently whenever the attendant plugs into the jack 145, one of the fourteen daily recorder lamps 102-115 will be lighted, depending upon the position of brush B-3. The first weekly recorder lamp 116 finds its ground over conductor W-D-1, which is strapped to the first seven bank contacts for brush B-5. Similarly, the second weekly recorder lamp 117 finds its ground over conductor W-D-2 which is strapped to contacts 8-14 for brush B-5. Likewise the ground for the "balance" recorder lamp 118 is provided over conductor BAL which is strapped to contacts 7 and 14 of brush B1.

It will be assured, for purposes of explanation, that the attendant is revising the recorded information for Sunday, February 27th. When the tion represented by the panel in Fig. 11. Merely for convenience in description, it will be assumed that the operator starts at 12:01 a. m. on Monday, February 14th, during the current week. Under this assumption, the brushes of switch 148 will still be on their #1 contacts, since they are not stepped to their #2 contacts until 4 a. m. Monday morning. Consequently, when the attendant inserts plug 146 into jack 145, an obvious circuit is closed to light lamp 102. This indicates to the attendant that the information on daily recorder #1 has become obsolete, and the attendant proceeds to record on this unit the information for Sunday, February 27th. When the information has thus been recorded, the attendant operates key 149, which causes the operation of relay G1. Relay G1 thereupon locks through its inner contacts, via conductor 150, to ground, through a clock control switch 151. This switch is common to all the circuits, and is arranged to be closed every day between 12 m. and 4 a. m. Consequently during this period the destination lamp 101 is lighted, and remains lighted until the attendant operates key 149. When relay G1 operates, it applies ground over conductor SM-1 to the terminal in the connector switch allotted to this particular destination. Consequently when the S brush of the connector 6 strikes this terminal, it extends the ground over conductor SH (see Figs. 4, 5A and 5B), to operate relay S in the calendar shift as described above. In other words, the operation of key 149 gives an indication to the connector circuit, via relay G1, that the #1 daily recorder has had the information recorded thereon corresponding to the first day of the third week. Thereupon the attendant plugs out of jack 102a, and plugs the microphone into the first weekly recorder jack 116a associated with lamp 116. It should be observed that during the first seven days of the current week, ground is extended over brush B-5, conductor W-D-1, to light lamp 116 when plug 146 is in jack 145. Thereupon the attendant revises the record on the weekly recorder #15 for the third week, so that it includes only the record for Monday through Saturday (see Fig. 14).

Consequently on Sunday morning of the second week, that is February 20th, under the above assumed conditions, all the first seven daily recorders #1-#7 have had their daily records replaced by the daily records for the third week. Since the information on the first weekly recorder #15 is now entirely removed, the operator at some time between 12 m. and 4 a. m. of Sunday, February 20th, plugs into jack 116a, and records on weekly recorder #15 (see Fig. 14) the entire weekly information for the fifth complete week, and thereupon she plugs into jack 118a and deletes from the record on the "balance" recorder, the original record thereon for the fifth week. Similarly, at the end of the fourteenth day, that is on Sunday morning between 12 m. and 4 a. m. on February 27th, under the above assumed conditions, the daily recorders #8-#14 have now had recorded thereon the daily records for the days of fourth week which were previously recorded on #16. During the same interval the attendant replaces the record on the recorder #16 with the record for the sixth week, and immediately thereafter revises the record on the "balance" recorder so that it is confined to the record for the seventh to tenth weeks.

A similar procedure is gone through in connection with the grade #2 destination (see Fig. 15). After the passage of the first day of the current week, for example on Monday morning, February 14th, between 12 m. and 4 a. m., brush B-1 of switch 148 is on its #1 contact, and extends ground over conductor DA-1 to the first daily lamp 120. Consequently when the attendant inserts plug 146 into destination jack 152, lamp 120 is lighted. The attendant then plugs the microphone into jack 120a, and replaces the previous record on the #1 daily recorder with the daily record for Sunday, February 20th. When the attendant has thus revised the daily record, key 149 is again operated, causing relay G2 to operate, and it immediately locks up through the clock-controlled ground wire 150. At the same time ground is extended through the contacts of relay G2 to the conductor SM which is connected to the bank contact in the connector switch representing this destination. On the following day, when switch 148 has stepped to its #2 position, when the attendant plugs into jack 152, the second daily recorder lamp 121 is lighted, and the attendant also plugs the recording microphone into jack 121a to replace the record on the second daily recorder with the record for one week following, namely February 21st. It will be understood, of course, that when the operator has revised the record on the daily recorders for the first four days, each time a revision is made, the record on the corresponding semi-weeky recorder #8 for the first four days of the second week is removed so that this semi-weekly recorder becomes available for containing a record for the first four days of the third week (see Fig. 15). At the end of the fifth day, the previous information on the fifth daily recorder has become obsolete. Brush B1 5th contact grounds conductor DA-5. Brush A-1 is now on its #5 contact, and grounds conductor T–W–2 so that when the attendant plugs into jack 152, lamps 124 and 128 are lighted. The attendant then revises the record on the #5 daily recorder so that it refers to the fifth day of the second week. Immediately thereafter the attendant plugs into jack 128a and deletes from the semi-weekly recorder #9 the information pertaining to Thursday of the second week. Thus at the end of the first current week, the seven daily recorders now contain daily information corresponding to Sunday through Saturday of the second week. At the same time the second semi-weekly recorder #9 is now available to receive a record for Thursday, Friday and Saturday of the third week. In the meanwhile the attendant has erased from the first weekly recorder #10 the record for the complete third week which is now supplied by the two semi-weekly recorders #8 and #9. This first weekly recorder #10 is now available to receive the information for the complete fifth week, and the attendant deletes from the "balance" recorder the previous recorded information for the fifth week.

A similar procedure is gone through for a grade #3 destination. When the attendant plugs into the destination jack 153 associated with the grade #3 destination panel, battery is applied to the lamps, and on Monday and Tuesday of the current week, brush A–3 extends ground over conductor TH–1 to light lamp 133. Thereupon the attendant plugs the recording microphone into jack 133a to replace the record on the tri-weekly recorder #1 with the information pertaining to Sunday and Monday on the following week. Likewise at the end of Thursday of the current week, the information on the second tri-weekly recorder #2 is obsolete, and brush A–3 of switch 142 grounds conductor TH–2 so that when the attendant plugs into jack 153, the lamp 134 is lighted. The attendant then replaces the record for Tuesday, Wednesday and Thursday on this tri-weekly recorder #2 with the information corresponding to Tuesday, Wednesday and Thursday of the following week. Similarly at the end of Saturday, brush A–3 is on contact #7, and grounds contact TH–3 so that when the attendant plugs into jack 153, lamp 135 is lighted, and the attendant plugs the recording microphone into the associated jack 135a to replace the record on the third tri-weekly recorder #3 with that corresponding to Friday and Saturday of the second week. It will be understood, of course, that as each tri-weekly record is revised, the attendant also deletes from the first tri-weekly recorder the information previously representing Sunday, Monday and Tuesday of the second week, so that eventually at the end of the first current week, the entire record on the first weekly recorder becomes available, and the attendant records thereon the information for the fourth full week, and the attendant correspondingly deletes the same information from the "balance" recorder.

It will thus be seen that by means of the various destination panel circuits, the attendant is enabled to keep the records on all the recorders current, so that all the recorders, whether daily, semi-weekly, tri-weekly, weekly, or "balance," contain the correct information, and provision is made so that even though dialing should take place in the period allotted for revision of the records, for example 12 m. to 4 a. m., the appropriate and shortest form of record corresponding to the dialed date, will be available.

Figs. 14–17 show in diagrammatic form the manner in which the various recorders are cyclically seized for various dialing dates and various reservation dates. Since daily recorders are used in the #1 and #2 grades of destinations, individual daily dialing dates are shown for the first two weeks of a typical period for grade #1 destination and for the first full week of a typical grade #2 destination. In Figs. 14–17, the reservation dates are listed horizontally and the dialing dates are listed vertically. Figs. 14 and 15 show clearly how the record on each daily recorder, as it becomes obsolete, is entirely replaced by the current daily information for the corresponding future date. However, in the case of grade #3 destination (Fig. 16), only four dialing dates are illustrated. It will be understood, of course, that as the information on any particular tri-weekly recorder becomes obsolete by the passage of a day, the information on that particular recorder pertaining to that past day is deleted and the record revised on the recorder so that it is confined to the remaining days of the tri-weekly period. The same also applies to the grade #4 destinations. In this case only three dialing dates are shown for the first, second and third weeks. Here again as each day passes, the attendant deals from the corresponding weekly recorder this obsolete information, and re-records the remainder of the weekly information for the remaining days of that week. As stated hereinabove, when the destination switch seizes a particular recorder, it causes the said recorder to play back the previously recorded information. While any well-known motor control circuit may be used for this purpose, a typical simplified schematic of the recorder and its control is shown in Fig. 18. The recorder unit is schematically illustrated as comprising an endless band 155, having associated therewith the usual recording head 156 and the usual play-back head 157. A suitable motor 158 is coupled to the spool or drum which carries the band 155. Motor 158 is provided with driving power from suitable power terminals 159 which are arranged to be closed by a relay 160 which is operated by ground applied to the PLAY wire at the destination switch. As indicated above, when the connection is established to the desired recorder, there is included in the circuit either a high-gain or a low-gain amplifier. The particular amplifier that is connected, is controlled by a relay LA (Fig. 4) which is operated or non-operated, depending upon that sub-group of calling lines which includes the line from which the dialing takes place, so as to make sure that the play-back is received with a suitable and uniform level by the reservation clerk at the calling station.

The system also makes provision in the event that erroneously there should be dialed a fourth or DAY digit in excess of seven. Thus as shown in Figs. 5 and 5B, the DS–4 bank of the DAY switch (Fig. 5A) has its 8th, 9th, and 10th terminals strapped to ground. Consequently, if the dialing should result in the setting of this switch on any of these three contacts, ground is extended backwardly over the conductor NE to a relay T in the connector circuit which causes a characteristic tone to be transmitted back over the calling line to indicate that a false reservation day has been dialed.

It will be understood, of course, that while specific code numbers have been allotted to the various destinations, this is done merely by way of example. Likewise, while switches of the step-by-step type have been disclosed, it will be understood that any other well-known automatic signal switches or automatic digitally-directed switches can be used. Furthermore, while Fig. 1 shows only one grade allocated to a given destination switch, it is possible to utilize one destination switch for two or more grades, the particular grade marking required being supplied from the calendar-translator. For example, destination switch 10—1 may contain destinations of grades #1 and #4; destination switch 10—2 may contain destinations of grades #2 and #4; destination switch 10—3 may contain destinations of grades #2, #3 and #4; and destination 10—4 may contain destinations of grades #2 and #3.

It will be understood, of course, that the connection is broken down in the conventional manner when the calling revervation clerk disconnects by placing his receiver on the switch hook. This removes holding ground for the various switches, and the removal of this ground from conductor H (Figs. 5A and 5B), causes the release of relay C. The release of relay C through its #5 and #7 contacts and through the #5 and #7 contacts of relay B, closes an obvious stepping circuit for magnet WS to restore the week switch 8 to its normal position. Likewise a circuit is closed through the stepping magnet DS through the 5th and 7th contacts of relay DON and the 25th and 26th contacts of relay C, causing the brushes of the day switch 9 to be restored to normal. In the normal position of this switch, relay DON releases and prevents further movement thereof. Similarly, in the well-known manner, the seized destination switch is restored to normal by the conventional normalizing circuit as a result of the disestablishment of the connection. For a detailed description of a typical normalizing circuit for a two-motion switch such as the destination switch, reference may be had to the above-noted book by A. B. Smith. Furthermore, while Fig. 1 of the drawing shows an individual destination switch with the bank contacts connected to a particular group of recorders, this is not absolutely necessary. For example, various grades of destination recorders can be multipled to two or more destination switches, since it is well-known in the art that the terminals of the various destination switches may be cross-connected so that the marking of the selected terminal in any destination switch will cause that switch to hunt for the correct recorder unit. Furthermore, while the system has been explained in connection with the use of line-finders and so-called connector switches, it will be understood that instead of line-finders, so-called line switches may be employed, and instead of the connector switch being operated directly by the first two dialed impulses, any other well-known type of circuit may be employed for seizing an appropriate destination switch. For example the switch 6 may be controlled by any well-known director circuit or by revertive impulses, as is well-known in the automatic telephone art.

What is claimed is:

1. A recorded intelligence communication system, comprising a plurality of terminal elements each having recorded information allotted to a series of cyclically recurring future time intervals, certain of said elements having records for one length of time interval and other elements having records for different lengths of time intervals, a calling station, means for automatically connecting said calling station to any one of said desired elements to obtain information contained thereon for a desired time interval, the last-mentioned means including a time interval translating circuit which is selectively set in response to a digital code representing the particular time interval or portion thereof for which the recorded information is desired, and circuit connections between said translating means and said automatic connecting means for variably setting said connecting means in accordance with the time interval between the date on which the information call is being placed by said calling station and the actual future date for which said information is desired.

2. An intelligence communication system, comprising a plurality of terminal elements each having a record of graded information allotted to a series of future calendar dates, a calling line, means for extending said calling line to any desired one of said elements to obtain desired recorded information, the last-mentioned means including a chain of automatic switches and a time interval translator mechanism selectively responsive to a plural digit code wherein certain digits represent the grade of information desired and the remaining digits represent the week and day for which the recorded information is desired, said translator mechanism being connected to said automatic switches for availably setting the same in accordance with the time interval between the date on which the information call is being placed by said calling station and the future date for which said information is desired.

3. An intelligence communication system, comprising a plurality of terminal elements each having a record of graded information allotted to a series of future calendar dates, a calling line, a first automatic switch, a second automatic switch, said elements being connected to the bank contacts of said second switch, means for setting the first switch selectively in response to a digit of a dialed code, time interval translator means responsive to the setting of said first switch and to other dialed digits of said code to cause said second switch to seize a particular one of said terminal elements having the recorded information for a desired future date, said translator means being connected to said second switch for variably setting it in accordance with the time interval between the date on which the information call is being placed by said calling station and the future date for which said information is desired.

4. An intelligence communication system, comprising a plurality of terminal record units each having an informational record allotted to a series of days in a predetermined period with the total number of said units materially less than the total number of days in said period, a calling line, and means for selectively connecting said line to the particular unit having the recorded information for a desired future date, the last-mentioned means including a chain of automatic switches respectively controlled by a plural digit code, and time interval translating means connected to control the variable setting of said switches in accordance with the interval between the date on which the information is being sought by the calling line and the future date for which said information is desired, two digits of which represent the week and day for which the recorded information is desired.

5. An intelligence communication system according to claim 4 in which said terminal elements are arranged in groups with one group containing recorded information pertaining to one selected point and with another group containing recorded information pertaining to another selected point, and said chain of switches includes an automatic switch which is controlled by said two digits and another automatic switch which is controlled by the remaining digits of the dialed code which remaining digits represent said desired point.

6. An intelligence communication system according to claim 4 in which each of said terminal elements is in the form of a recorder-playback unit, and means are provided for causing the selected-playback unit to repeat back the recorded information thereon to the calling line.

7. A system for automatically announcing traffic or similar information with respect to a certain point, comprising a plurality of recorder-playback units certain of which contain single-daily records for future days pertaining to said point, and others of which contain multi-daily records for a group of future days pertaining to said point, a calling station, and means controlled from said calling station to connect in circuit therewith either a single-daily record unit pertaining to a selected day or a multi-daily record unit which includes the information for said selected day, the last-mentioned means including a translator circuit which operates in accordance with the number of days intervening between the selected day and the day on which the information concerning said point is being sought.

8. A system according to claim 7 in which said translator circuit includes automatic switches responsive to dialed digits representing respectively the week and day of the week for which the recorded information is being sought.

9. A system for automatically announcing traffic or similar information with respect to a certain point, comprising a plurality of recorder-playback units certain of which contain single-daily records for future days pertaining to said point and others of which contain multi-daily records for a group of future days pertaining to said point, a calling station, a first automatic switch, a second automatic switch, means responsive to certain dialed digits representing said point to set said first switch, and means including time-interval translating mechanism responsive to other dialed digits representing the week and day of a selected future date for which information pertaining to said point is desired and also responsive to the setting of said first switch to cause said second switch to seize a particular recorder-playback unit containing the desired information with respect to said point.

10. A system for automatically announcing traffic or similar information for a predetermined time period with respect to a certain destination, comprising a plurality of recorder-playback units, certain units containing said information confined respectively to single future days in said period, another unit containing said information covering a series of successive days in said period, still another unit containing said information covering the balance of all the days in said period, a calling station, and automatic switch means controlled by a digital code dialed from said station for selecting the appropriate one of said units and automatically in accordance with the number of days intervening between the selected date for which said information is desired and the day on which it is being sought, the last-mentioned means including time-interval translating mechanism.

11. A system for automatically announcing traffic or similar information for a predetermined future period with respect to a certain destination, comprising a plurality of recorder-playback units certain units being daily units for individual days following that upon which the information is being sought, another unit being a weekly unit containing information for the week subsequent to the days for which information is carried by said daily units, a balance unit for the remainder of said period subsequent to the week for which information is carried by said weekly unit, a calling station, and automatic switch means controlled by a digital code dialed from said station for selecting the appropriate one of said units, and automatically in accordance with the number of days intervening between the selected date for which information is desired and the day upon which the information is being sought, the last-mentioned means including time-interval translating mechanism.

12. A system for announcing information of the type described, and for a predetermined number of future weeks with respect to a certain destination, comprising a plurality of recorder-playback units certain units containing individual daily records for a series of individual days subsequent to the day on which information is being sought, other units containing a complete weekly record of said information for corresponding respective weeks subsequent to the period covered by said daily units, and a balance unit containing a complete record of said information for the period subsequent to that covered by said weekly units, a calling line, and automatic switch means controlled by dialed impulses from said calling line to automatically connect in circuit therewith the appropriate one of said units and automatically in accordance with the number of days intervening between the selected date for which said information is desired and the day upon which it is being sought, the last-mentioned means including time-interval translating mechanism.

13. An intelligence communication system for automatically announcing information of the type described pertaining to a series of destinations, comprising a plurality of sets of recorder-playback units one set for each destination, certain units of each set having daily records and other units of each set having multi-daily records, a calling line, means to connect said line to the particular unit carrying information relating to a desired future date, the last-mentioned means including automatic switches which are selectively set in accordance with a four-digit code dialed from said calling line, said code having two of its digits representing the desired destination and the remaining two digits representing the week and day for which the information is being sought, and time-interval translating mechanism for controlling the setting of said switches in accordance with the interval between the date on which information is being sought by said calling line and the future date for which said information is desired.

14. An intelligence communication system according to claim 13 in which the last-mentioned means includes a first automatic switch responsive to two digits of the dialed code and other automatic switch means responsive to the remaining two digits of the dialed code.

15. A system for automatically announcing information of the type described pertaining to a series of different locations, comprising a plurality of sets of recorder-playback units one set for each of said locations, certain of said units having single-daily records and others having multi-daily records covering a predetermined number of days, a calling line, means to dial over said line a four-digit code with two digits identifying the said location and the remaining two digits identifying respectively the week and day for which information pertaining to the desired location is to be played back, automatic switch means responsive to said dialed digits to connect in circuit with said line the particular unit bearing the desired information to be played back, and time-interval translating mechanism for controlling the setting of said switches in accordance with the interval between the date on which information is being sought by said calling line and the future date for which said information is desired.

16. In a system of the type described, a calling line, a plurality of destination switches, a plurality of sets of recorder-playback units one set for each of said destinations and arranged to be connected by one of said destination switches to said calling line, means to transmit from said line a four-digit code with two digits identifying the destination and two digits representing the week and day for which information is desired, and translator means controlled by said dialed digits to select a particular one of said destination switches to cause the particular recorder-playback unit to be connected to the calling line which unit contains the information for the desired date, said translator means including a mechanism which is variably set in accordance with the time interval between the date on which information is being sought by said calling line and the future date for which said information is desired.

17. In a system of the type described, a numerically directed automatic switch, a plurality of destination switches, a plurality of sets of recorder-playback units one set for each of said destinations and reached through a selected one of said destination switches, a calendar translator circuit including a calendar-shift element which is automatically advanced cyclically one step for each time interval unit and translating relays controlled by the number of time units between the time the information is being sought by the calling line and the future date for which such information is desired, a calling line, means to dial over said line a plural digit code for selectively setting said numerically directed switch and to control said translator, and means responsive to the joint setting of said numerically directed switch and said translator to cause a particular one of said destination switches to connect in circuit with the calling line the appropriate one of said recorder-playback units containing the information for a desired date.

18. In a system of the type described, a numerically directed switch, a plurality of destination switches, a translator circuit, a plurality of sets of recorder-playback units with one set for each destination, a calling line, means to dial over said line a four-digit code, means responsive to the first two dialed digits for selectively setting said numerically directed switch, said translator circuit having first and second automatic switches and a calendar-shift device which is automatically advanced one step per unit time, means for respectively setting said first and second switches in response to the second two digits of the dialed code, and means responsive to the joint setting of said numerically directed switch and of said first and second switches to cause a particular destination switch to connect to the calling line a particular recorder-playback unit having the information for a desired date.

19. In a system of the type described, a numerically directed switch, a plurality of destination switches, a translator circuit, a plurality of sets of recorder-playback units with one set for each destination, a calling line, said translator circuit including a weekly switch and a daily switch, a calendar-shift switch which is automatically advanced one step per day, means for automatically setting said numerically directed switch in accordance with a desired destination, means for automatically setting said weekly switch and said daily switch respectively in accordance with the week and the day in that week for which information is desired, and means responsive to the joint setting of said numerically directed switch, said weekly switch and said daily switch to mark a particular destination switch for operation and to mark a particular set of contacts in the marked destination switch to which set of contacts is connected the appropriate recorder-playback unit containing the recorded information for the desired date.

20. In a system of the type described, a calling line, a numerically directed connector switch, a plurality of destination switches, a plurality of recorder-playback units connected to respective contact sets in said destination switches, a calendar translator circuit, a calendar-shift switch which is automatically advanced one step per day, means to dial over said calling line a four-digit code the first two digits of which represent a desired destination, the third digit of which represents the number of weeks between the current week and the week which includes the future day for which information is being sought, the fourth digit of which code represents the said day, means responsive to the dialing of the first two digits and responsive to the setting of said calendar-shift switch for selectively setting said connector switch and thereby to select for operation one of the said destination switches, means responsive to the dialing of the third and fourth digits to cause the selected destination switch to hunt for a particular set of terminals to which is connected the appropriate recorder-playback unit containing the information for said future day.

21. A system according to claim 20 in which each destination switch has banks of contact sets with four contacts in each set and with four corresponding selectively movable brushes, means including two of said brushes for completing a message path between the seized recorder-playback unit and the calling line, means including a third one of said brushes for starting the seized recorder-playback unit in operation, and means including the fourth of said brushes for switching the said unit from recording to playback position.

22. In a system for announcing information of the type described pertaining to at least two destinations of different grades, a plurality of sets of recorder-playback units one set for each of said destinations, the set for one destination consisting of daily records for a sequence of "$n$" days, the said set also including at least one weekly record for a full week subsequent to that covered by the daily records, the said set also including a "balance" record covering the remainder of the period subsequent to that covered by the weekly record, a plurality of destination switches having banks of contact sets to which said units are connected, means including a translator circuit for selecting a particular destination switch and for causing it to seize a particular recorder-playback unit containing the record for a desired date, said translator circuit including a calendar-shift device which is automatically advanced one step per day, means to insure that a daily record unit is seized by the destination switch when "$n$" or a less number of days intervene between the said desired date and the date on which the information is being sought.

23. A transportation information system for automatically obtaining reservation information and the like for a desired destination, comprising a set of message information transmission units having recorded thereon the said information for a predetermined future period, said set including daily record units having only complete daily recordings for an initial portion of said period, said set including another unit containing a complete recording for an intermediate portion of said period consisting of a group of days subsequent to said initial period, said set also including a "balance" unit containing a complete recording for all the remaining days of said period, a calling line, means responsive to a dialed plural digit code for automatically and selectively connecting said calling line to a daily record unit if the reservation date is within said initial period or to said other unit if the reservation date is in said intermediate period, or to said "balance" unit if the reservation date is in said "balance" period, the last-mentioned means including a calendar-shift switch which is automatically advanced one step per day.

24. A system according to claim 23 in which the last-mentioned means includes a numerically directed switch, a destination switch having banks of contact sets to which said units are respectively connected, a calendar translator mechanism, means to set said numerically directed switch in response to a dialed code representing said destination, means to set said translator mechanism in response to a dialed code representing the week and day of the reservation date, and means effective upon the setting of said destination switch to cause the appropriate one of said units to transmit back to a calling station the information recorded on said unit.

25. A system according to claim 23 in which the last-mentioned means includes a numerically directed switch, a destination switch having banks of contact sets to which said units are respectively connected, a calendar translator mechanism, said mechanism including digitally responsive switches and a set of translator relays whose combined setting determines the type of unit to be seized by said destination switch.

26. A transportation information system for automatically obtaining reservation information and the like for any one of a plurality of destinations of different grades, comprising a plurality of sets of message information transmission units having recorded thereon the said information for a predetermined future period, each set being allotted to a corresponding grade of destination; one of said sets including daily record units having only daily recordings for an initial portion of said period extending through a plurality of weeks, said one of said sets also including at least one other unit containing a complete recording for an intermediate portion of said period consisting of a full week subsequent to said initial period, said one of said sets also including a "balance" unit containing a complete recording for all the remaining days of said period; another of said sets including daily record units having only daily recordings for an initial portion of said period extending through only one week, said other set including at least one other unit containing a complete recording for an intermediate period of a week subsequent to said initial period, the said other set also including a "balance" unit containing a complete recording for all the remaining days of said period; a calling line; a plurality of destination switches; a translator mechanism responsive to a dialed digital code for selecting one of said destination switches, and for causing the selected destination switch to connect to said calling line the particular unit having the information for a desired reservation date and in particular one of said sets allotted to the desired destination, said translator mechanism including a calendar-shift switch which is automatically advanced one step per day.

27. A transportation information system for automatically obtaining reservation information and the like for any one of a plurality of destinations of different grades, a plurality of sets of message information transmission units having recorded thereon the said information for a predetermined future period, each set being allotted to a corresponding grade of destination, the first of said sets including daily record units having only respective single-daily recordings for an initial portion of said period extending through a plurality of weeks, said first set also including at least one other unit containing a complete recording for an intermediate portion of said period consisting of a full week subsequent to said initial period, said first set also including a "balance" unit containing a complete recording of all the remaining days of said period; the second set including daily record units having only respective single-daily recordings for an initial portion of said period extending through a single week, said second set also including at least one other unit containing a complete recording for an intermediate portion of said period consisting of a full week subsequent to said initial period, said second set also including a "balance" unit containing a complete recording for all the remaining days of said period; the third set including a plurality of multi-daily units each having a recording for a plurality of days in said initial period extending through a single week, said third set also including at least one other unit containing a complete recording for an intermediate portion of said period consisting of a full week subsequent to said initial period, said third set also including a "balance" unit containing a complete recording for all the remaining days of said period; a calling line, a plurality of destination switches, a translator mechanism responsive to a dialed plural digit code for selecting one of said destination switches and for causing the selected destination switch to connect said calling line to the particular unit in one of said sets having the recorded information for a desired reservation date corresponding to a particular destination, said translator mechanism including a calendar-shift switch which is automatically advanced one step per day.

28. A system according to claim 27 in which a fourth set of recorder units is provided, said fourth set consisting of a first weekly record unit for the initial period, a second weekly record unit for the week subsequent to said initial period and a "balance" record unit for the remainder of said period.

29. In a system of the type described, a destination switch having a plurality of contact sets, a plurality of recorder-playback units respectively connected to said contact sets, one of said units having a single-daily record for a desired reservation date, another of said units having a multi-daily record for a series of days including said reservation date, means responsive to a predetermined dialed code for normally causing said destination switch to seize said daily unit if its record has meanwhile been rendered current for said reservation date, and means responsive to the same dialed code for causing said destination switch to seize said multi-daily unit if the record on said single-daily unit has not been rendered current for said reservation date.

30. In a system of the type described, a destination switch having a plurality of contact sets, a plurality of recorder-playback units respectively connected to said contact sets, one of said units having a weekly record and another unit having a fractional-weekly record, means responsive to a predetermined dialed code for normally causing said destination switch to seize said fractional-weekly unit if its record has meanwhile been rendered current for the desired reservation date and the said reservation date is less than a predetermined number of days in advance of the dialing date; a recording attendant's position having means at regular period of each day to replace the obsolete information on a fractional-weekly unit with the information for a reservation date which is said predetermined number of days in advance of the dialing date; and means responsive to the said code if dialed during one of said regular periods and when the said replacement has not been made by the recording attendant to cause said destination switch to seize said weekly unit instead of said fractional-weekly unit.

31. In a system of the type described, a destination switch having a plurality of contact sets, at least one single-daily record unit connected to one of said contact sets, at least one multi-daily record unit connected to another of said contact sets, recording operator means to revise said records at a regular period during each day, means responsive to the dialing of a predetermined code for causing said destination switch to seize said single-daily unit whenever less than a predetermined number of days intervene between the dialing date and the reservation date, and means responsive to the dialing of the same code for causing the destination switch to seize said multi-daily unit if the recording operator has not revised the record on the single-daily unit when the dialing takes place during said revision period.

32. In a system of the type described, an automatic switch having a plurality of contact sets, a single-daily recorder-playback unit connected to a corresponding one of said contact sets, a multi-daily recorder-playback unit connected to another one of said contact sets, a calling station, a recording operator's position having means to revise the records on said units, means responsive to the dialing of a plural-digit code from said station for selectively setting said switch to seize a unit containing the previously recorded information for the desired reservation date, and means to insure that the unit so seized contains the correct information for said date even though the said dialing takes place during the period when said operator is revising said records.

33. A system according to claim 32 in which the last-mentioned means includes a dialed-digit translator mechanism including weekly and daily switches selectively set in response to two dialed digits representing the week and day of the reservation date, a translator relay which is effective when less than a predetermined number of days intervene between the dialing date and the reservation date to cause said automatic switch to seize a single-daily record unit, and another relay controlled from said recording operator's position to render said translator relay ineffective if the dialing takes place during the revision period and the recording operator has not in the meanwhile revised the record on the single-daily unit which would otherwise be seized by said automatic switch.

34. A system for automatically obtaining reservation and similar information for a future period comprised of a plurality of weeks, and including means to transmit a two-digit code with the first digit being between 1 and "$n$" where "$n$" is the number of weeks in the said period, the second digit being from 1 to 7 representing respectively the successive days of a week, a plurality of recorder-playback units one of said units being a weekly record unit and another being a single-daily record unit, an automatic switch for selectively seizing one of said units in accordance with said code and in accordance with the number of intervening days between the dialing date and the reservation date, and means for controlling the setting of said switch, the last-mentioned means comprising a digit translator including a weekly switch set by the first dialed digit, a daily switch set by the second dialed digit, a day relay, a week relay, a calendar control switch which automatically advances one step for each successive day, circuits for selectively operating said relays in accordance with the conjoint settings of said weekly switch and said calendar control switch, and other circuits effective when said day relay is operated for causing said automatic switch to seize a single-daily recorder only.

35. A translator arrangement for translating calendar data into selective settings of an automatic switch, comprising a first digitally-controlled switch, a second digitally-controlled switch, means to set said first switch by numerical impulses representing the number of weeks intervening between the current week and a future week containing a particular day for which previously-recorded information is to be obtained, means to set said second switch by other numerical impulses representing said particular day, a calendar-shift switch which is automatically advanced one step per day, a translator control relay which responds whenever the said particular day is not more than a predetermined number of days in advance of the current day, a series of selective terminals, and circuits for selectively marking a particular one of said terminals in accordance with the conjoint setting of said first and second switches and said relay.

36. A translator arrangement according to claim 35, in which each of said selective terminals has connected to it a recorder-playback unit with certain units containing a single daily record and other units containing a multi-daily record, said relay when non-operated causing one of said daily units to be connected in circuit, and said relay when operated causing one of said multi-daily units to be connected in circuit.

37. A translator arrangement for translating calendar data into selective markings for an automatic switch, comprising means to receive a two-digit code the first digit representing the number of weeks between the current week and a future week which includes a particular day for which information is to be obtained, the second digit varying from 1 to 7 in accordance with the day of the week on which said particular day falls, a first numerical switch controlled by pulses corresponding to the first digit, a second numerical switch controlled by pulses corresponding to the second digit, a first relay which responds whenever said particular day is not more than a predetermined number of days in advance of the current day, a second relay which responds in accordance with the first or second part of the said future week which contains said particular day and also in accordance with the first or second part of the current week containing the current day, a series of selective terminals, and circuits to selectively mark a particular one of said terminals in accordance with the conjoint setting of said first and second switches and of said relays.

38. In a playback system of the type having a series of recorder-playback units containing reservation data and the like with certain units containing single daily records, other units containing two-per-week records and other units containing three-per-week records, a translator arrangement for selectively connecting the appropriate type of unit in circuit with a calling station, said translator arrangement comprising means to receive a two-digit code the first digit representing the number of week between the current week and a future week which includes a particular day for which information is to be obtained, a second digit varying from 1 to 7 in accordance with the day of the week on which said particular day falls, a first numerical switch which is set under control of the first digit, a second numerical switch which is set under control of the second digit, a set of three translator control relays and circuit arrangements for selectively operating said relays in accordance with the setting of said second switch, a series of selective terminals, and circuits for selectively marking a particular one of said terminals in accordance with the conjoint setting of said first and second numerical switches and of said relays.

39. A system according to claim 38, in which a daily stepping switch is provided having means to step it automatically one position for each succeeding day, the circuits for operating said relays being controlled by the conjoint setting of said second numerical switch and said stepping switch.

40. A translator arrangement for translating calendar data into selective settings of an automatic switch, comprising a first numerically-controlled switch, a second numerically-controlled switch, means to set said first numerically-controlled switch under control of numerical impulses representing the number of weeks intervening between the current week and a future week containing a particular day for which previously-recorded information is to be played back, means to set said second numerical switch under control of other numerical impulses representing said particular day, a translator control relay, a series of terminals one of which is selectively marked under control of the conjoint setting of said first and second numerical switches and said relay, and means to operate said relay whenever said particular day is not more than a particular number of days in advance of the current day, the last-mentioned means including a daily calendar counting switch having means to automatically advance it one step per day, a set of seven conductors each connected to seven successive and respective bank contacts in one bank of said second switch, said calendar counting switch closing a circuit to operate said relay over the first of said conductors during the second day of the current week and thereafter closing a circuit to operate said relay successively over the remaining conductors on the remaining days of the current week.

41. A calendar data translating arrangement for systems of the type described, comprising a first numerically-directed switch to be selectively set under control of impulses representing the number of weeks intervening between the current week and a future week containing a reservation date; a second numerical switch to be selectively set under control of impulses representing the said reservation day, said second switch having a daily bank of fixed contacts and a cooperating brush, a twice-per-week bank and cooperating brush, a three-per-week bank and cooperating brush; a day translator control relay connected to the brush for said daily bank, a twice-per-week translator control relay connected to the brush for said second bank, a three-per-week translator control relay connected to the brush for said third bank; a calendar day counting switch having means to automatically step it one position per day; and circuits for selectively operating said relays under control of the conjoint setting of said second switch and said calendar day counting switch.

42. A translating arrangement according to claim 41, in which a fourth translator control relay is provided having an operating circuit controlled by said calendar counting switch on the first day of each alternate week independently of said second switch.

43. An information exchange system for providing traffic and similar information with respect to destinations of two or more traffic grades; comprising a first numerical switch arranged to be numerically set in response to a first code digit representing the number of weeks intervening between the current week and a future week containing a reservation date; a second numerical switch arranged to be set in response to a second code digit representing the reservation date; said first switch having a plurality of banks of contacts; means automatically effective in accordance with the grade of destination for which information is to be obtained to render a corresponding one of said banks effective; said second numerical switch having six banks of contacts and respective brushes, one of said six banks having seven successive contacts individually connected to seven corresponding terminals to be electrically marked, the second of said six banks having seven contacts strapped in two predetermined sets each set being connected in multiple to a respective one of said terminals to be electrically marked, the third of said six banks having seven successive contacts multipled in three groups each of said groups being connected to a corresponding one of said terminals to be electrically marked; a set of translator control relays for controlling the effectiveness of said first, second and third banks; the fourth of said six banks having seven contacts individually connected to a set of seven daily conductors, the fifth of said six banks having seven successive contacts strapped to form two sets corresponding to the strapping of the two sets of contacts in said second bank, and the sixth bank having seven successive contacts strapped in three groups to correspond with the strapping of the contacts in said third bank; respective translator control relays connected to the brushes of the fourth, fifth and sixth banks; and an automatic daily stepping switch for selectively grounding the contacts of the fourth, fifth and sixth banks to control the selective operation of said relays and thereby to determine whether said terminals are to be electrically marked through the first, second or third banks.

44. In a system of the type described, a set of recorder-playback units carrying information pertaining to a particular destination certain of said units having single daily records and other of said units having multi-daily records, automatic switch means including a calendar translator circuit controlled by dialed impulses to select a particular one of said units, a recording operator's position for keeping the information on said units current with respect to predetermined periods in advance, said position having a series of indicator lamps and jacks each allotted to a particular recorder-playback unit, means to plug a recording microphone into any one of said jacks, and a key operated by the attendant upon the revision of a record on any unit for transmitting a characteristic signal to said calendar translator circuit for the purpose set forth.

ERIC MALCOLM SWIFT McWHIRTER.
FREDERICK G. POPP.

References Cited in the file of this patent

UNITED STATES PATENTS

| Number | Name | Date |
|---|---|---|
| 449,543 | Kelly | Mar. 31, 1891 |
| 1,331,151 | Hopkins | Feb. 17, 1920 |
| 1,711,041 | Carson | Apr. 30, 1929 |
| 1,716,600 | Rehder | June 11, 1929 |
| 1,906,646 | Smith | May 2, 1933 |
| 1,992,271 | Williams | Feb. 26, 1935 |
| 2,080,100 | Tauchek | May 11, 1937 |
| 2,088,942 | Boswau et al. | Aug. 3, 1937 |
| 2,224,244 | Hicks | Dec. 10, 1940 |
| 2,264,052 | Quinby | Nov. 25, 1941 |
| 2,398,067 | Winkler | Apr. 9, 1946 |